US011540145B2

(12) United States Patent
Raghavan et al.

(10) Patent No.: US 11,540,145 B2
(45) Date of Patent: Dec. 27, 2022

(54) TECHNIQUES FOR COMMUNICATIONS ON GRATING LOBES

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/198,917

(22) Filed: Mar. 11, 2021

(65) Prior Publication Data

US 2022/0295296 A1    Sep. 15, 2022

(51) Int. Cl.
*H04W 16/28* (2009.01)
*H04B 7/06* (2006.01)
*H04B 7/0408* (2017.01)

(52) U.S. Cl.
CPC .......... *H04W 16/28* (2013.01); *H04B 7/0617* (2013.01)

(58) Field of Classification Search
CPC ............................. H04B 7/0617; H04W 16/28
See application file for complete search history.

(56) References Cited

U.S. PATENT DOCUMENTS

| 11,019,617 B1* | 5/2021 | Ahmet ................. H04W 72/044 |
| 2014/0146863 A1 | 5/2014 | Seol et al. |
| 2017/0207840 A1 | 7/2017 | Tujkovic |

(Continued)

FOREIGN PATENT DOCUMENTS

WO    WO-2019061085 A1    4/2019

OTHER PUBLICATIONS

Huawei, et al., "Beam Indication for Control and Data Channels", 3GPP Draft, 3GPP TSG RAN WG1 Meeting 90bis, R1-1718238, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341420, 8 Pages, Retrieved from the Internet:URL:http://www.3gpp.org/ftp/Meetings_3GPP_SYNC/RAN1/Docs/ [retrieved on Oct. 8, 2017], p. 2-p. 4.

(Continued)

*Primary Examiner* — David S Huang
(74) *Attorney, Agent, or Firm* — Qualcomm Incorporated

(57) ABSTRACT

Methods, systems, and devices for wireless communications are described. To communicate messages using one or more grating lobes of a directional beam, a first device (e.g., a user equipment (UE), a base station) may transmit, to a second device, control signaling that indicates the transmission of a message on a grating lobe. The first device may determine a set of beamforming parameters for simultaneously transmitting the message to the second device and a third device. The first device may simultaneously transmit the message to third device on a main lobe and to the second device on the grating lobe. Additionally, or alternatively, the first device may simultaneously receive a message on a main lobe and a grating lobe of a directional beam. The first device may also communicate control signaling that indicates whether to simultaneously communicate the message on the main lobe and the grating lobe.

30 Claims, 18 Drawing Sheets

(56) References Cited

U.S. PATENT DOCUMENTS

2020/0337101 A1* 10/2020 Brooks ................ H04W 64/00
2021/0084611 A1* 3/2021 Kenington ........... H04B 17/318

OTHER PUBLICATIONS

Partial International Search Report—PCT/US2022/018788—ISA/EPO—dated Jun. 17, 2022.
CATT: "Beam Management for New SCSs for up to 71 GHz Operation", 3GPP TSG RAN WG1 #104e, R1-2100373, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051970976, 7 Pages p. 5-p. 6, figure 3.
International Search Report and Written Opinion—PCT/US2022/018788 -ISA/EPO—dated Sep. 26, 2022.
Mediatek Inc: "Enhancement on Multi-Beam Operation", 3GPP TSG RAN WG1 #104-e, RI-2100588, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021, XP051971059, 27 Pages.

\* cited by examiner

TECHNIQUES FOR COMMUNICATIONS ON GRATING LOBES

FIELD OF TECHNOLOGY

The following relates to wireless communications, including techniques for communications on grating lobes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications in millimeter wave (mmW) bands (e.g., from 30 gigahertz (GHz) to 300 GHz). Additionally, communication devices (e.g., UEs, base stations) may communicate over relatively wide bandwidths (e.g., a 14 GHz bandwidth or some other bandwidth) when communicating in the millimeter wave bands, and a radio frequency chain (e.g., an antenna array and associated radio frequency circuitry, such as analog to digital converters, digital to analog converters, mixers, or downconverters, among other radio frequency circuitry) may be optimized for communicating at a particular frequency of a bandwidth. However, in some cases, communications at various frequencies across the bandwidth may suffer performance degradation and decreased reliability due to directional beams operating differently at different frequencies.

SUMMARY

The described techniques relate to improved methods, systems, devices, and apparatuses that support techniques for communications on grating lobes. Generally, the described techniques provide for advantageously using grating lobes to transmit and/or receive messages. For example, directions corresponding to a main lobe and one or more grating lobes of a directional beam may be determined based on operating frequency and inter-antenna element spacing, among other factors. Accordingly, a first wireless device (e.g., a user equipment (UE), a base station, a transmission/reception point (TRP), or some other wireless device) may determine whether it may simultaneously transmit a message to multiple wireless devices on the main lobe and one or more grating lobes of the directional beam. The first wireless device may transmit control signaling to a second wireless device indicating the transmission of the message on the grating lobe. The first wireless device may determine a set of beamforming parameters (e.g., beam weights) that will generate the main lobe in the direction of a third wireless device and the grating lobe in the direction of the second wireless device. The first wireless device may then simultaneously transmit the message to third wireless device on the main lobe and to the second wireless device on the grating lobe. Additionally, or alternatively, the first wireless device may simultaneously receive a message on a main lobe and a grating lobe of a directional beam. For example, the first wireless device may receive the message from the second wireless device on the main lobe and may simultaneously receive the message from the third wireless device on the grating lobe.

Additionally, a wireless device may transmit control signaling to indicate whether simultaneous communication of messages using a main lobe and one or more grating lobes is possible. For example, if a grating lobe created by a set of beam weights used at the first wireless device will cause interference at a second wireless device, the second wireless device may transmit control signaling that indicates the first wireless device to switch operating frequencies such that a signal strength or a gain of the grating lobe in the direction of the second wireless device is reduced or eliminated.

A method for wireless communication at a first wireless device is described. The method may include receiving, from a second wireless device, control signaling indicating that a message is to be transmitted using a first lobe of a directional beam, the first lobe of the directional beam being different from a second lobe of the directional beam that is used to simultaneously transmit the message to a third wireless device, determining a set of beamforming parameters for receiving the message from the second wireless device based on the control signaling indicating that the message is to be transmitted using the first lobe of the directional beam, and receiving the message on the first lobe of the directional beam based on the set of beamforming parameters.

An apparatus for wireless communication at a first wireless device is described. The apparatus may include a processor, memory coupled with the processor, and instructions stored in the memory. The instructions may be executable by the processor to cause the apparatus to receive, from a second wireless device, control signaling indicating that a message is to be transmitted using a first lobe of a directional beam, the first lobe of the directional beam being different from a second lobe of the directional beam that is used to simultaneously transmit the message to a third wireless device, determine a set of beamforming parameters for receiving the message from the second wireless device based on the control signaling indicating that the message is to be transmitted using the first lobe of the directional beam, and receive the message on the first lobe of the directional beam based on the set of beamforming parameters.

Another apparatus for wireless communication at a first wireless device is described. The apparatus may include means for receiving, from a second wireless device, control signaling indicating that a message is to be transmitted using a first lobe of a directional beam, the first lobe of the directional beam being different from a second lobe of the directional beam that is used to simultaneously transmit the message to a third wireless device, means for determining a set of beamforming parameters for receiving the message from the second wireless device based on the control signaling indicating that the message is to be transmitted using the first lobe of the directional beam, and means for receiving the message on the first lobe of the directional beam based on the set of beamforming parameters.

A non-transitory computer-readable medium storing code for wireless communication at a first wireless device is described. The code may include instructions executable by a processor to receive, from a second wireless device, control signaling indicating that a message is to be transmitted using a first lobe of a directional beam, the first lobe of the directional beam being different from a second lobe of the directional beam that is used to simultaneously transmit the message to a third wireless device, determine a set of beamforming parameters for receiving the message from the second wireless device based on the control signaling indicating that the message is to be transmitted using the first lobe of the directional beam, and receive the message on the first lobe of the directional beam based on the set of beamforming parameters.

Some examples of the method, apparatuses, and non-transitory computer-readable medium described herein may further include operations, features, means, or instructions for receiving, from the second wireless device, a second message indicating a difference between a first gain associated with the first lobe of the directional beam and a second gain associated with the second lobe of the directional beam.

Some examples of the method, apparatuses, and non-transitory computer-readable medium described herein may further include operations, features, means, or instructions for decoding the message received on the first lobe of the directional beam based on the difference between the first gain and the second gain.

Some examples of the method, apparatuses, and non-transitory computer-readable medium described herein may further include operations, features, means, or instructions for transmitting, to the second wireless device, a third message indicating a modulation and coding scheme (MCS) for transmitting the message based on the difference between the first gain and the second gain.

Some examples of the method, apparatuses, and non-transitory computer-readable medium described herein may further include operations, features, means, or instructions for transmitting, to the second wireless device, feedback associated with communicating with the second wireless device on a second directional beam different from the directional beam, where the control signaling indicating that the message may be to be transmitted using the first lobe of the directional beam may be based on the feedback.

In some examples of the method, apparatuses, and non-transitory computer-readable medium described herein, the feedback includes a transmission configuration indication (TCI) state, one or more synchronization signal block (SSB) indices, an indication of whether a signal strength associated with the second directional beam satisfies a signal strength threshold, or a combination thereof.

In some examples of the method, apparatuses, and non-transitory computer-readable medium described herein, transmitting the feedback to the second wireless device may include operations, features, means, or instructions for transmitting the feedback on the second directional beam.

In some examples of the method, apparatuses, and non-transitory computer-readable medium described herein, receiving the control signaling from the second wireless device may include operations, features, means, or instructions for receiving the control signaling on a second directional beam different from the directional beam.

In some examples of the method, apparatuses, and non-transitory computer-readable medium described herein, the control signaling further includes a quasi-colocation (QCL) indication associated with the directional beam, where determining the set of beamforming parameters may be based on the QCL indication.

In some examples of the method, apparatuses, and non-transitory computer-readable medium described herein, the first lobe of the directional beam may be a grating lobe from a set of lobes corresponding to the directional beam and the second lobe of the directional beam may be a main lobe of the directional beam.

Some examples of the method, apparatuses, and non-transitory computer-readable medium described herein may further include operations, features, means, or instructions for transmitting, to the second wireless device, second control signaling indicating that a second message may be to be transmitted using a first lobe of a second directional beam, determining a second set of beamforming parameters for simultaneously transmitting the second message to the second wireless device and a fourth wireless device based on indicating that the second message may be to be transmitted using the first lobe of the second directional beam, and simultaneously transmitting the second message to the second wireless device and the fourth wireless device, where the second message may be transmitted to the second wireless device using the first lobe of the second directional beam and transmitted to the fourth wireless device using a second lobe of the second directional beam different from the first lobe of the second directional beam.

Some examples of the method, apparatuses, and non-transitory computer-readable medium described herein may further include operations, features, means, or instructions for transmitting, to the second wireless device, or the fourth wireless device, or both, a third message indicating a difference between a first gain associated with the first lobe of the second directional beam and a second gain associated with the second lobe of the second directional beam.

Some examples of the method, apparatuses, and non-transitory computer-readable medium described herein may further include operations, features, means, or instructions for receiving, from the second wireless device, or the third wireless device, or both, a fourth message indicating an MCS for transmitting the second message based on the difference between the first gain and the second gain, where simultaneously transmitting the second message includes simultaneously transmitting the second message according to the indicated MCS.

Some examples of the method, apparatuses, and non-transitory computer-readable medium described herein may further include operations, features, means, or instructions for determining a difference between a first gain associated with the first lobe of the second directional beam and a second gain associated with the second lobe of the second directional beam and adjusting a transmit power associated with simultaneously transmitting the second message to compensate for the difference between the first gain and the second gain.

In some examples of the method, apparatuses, and non-transitory computer-readable medium described herein, the set of beamforming parameters includes a set of beamforming weights used to generate the first lobe of the second directional beam and the second lobe of the second directional beam.

In some examples of the method, apparatuses, and non-transitory computer-readable medium described herein, the first lobe of the second directional beam may be a grating lobe of the second directional beam and the second lobe of the second directional beam may be a main lobe of the second directional beam.

A method for wireless communication at a first wireless device in a wireless communication system is described. The method may include receiving, from a second wireless device, control signaling indicating that a message is to be simultaneously transmitted from the second wireless device and from a third wireless device to the first wireless device, determining a set of beamforming parameters for simultaneously receiving the message based on the control signaling indicating that the message is to be simultaneously transmitted, and simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe.

An apparatus for wireless communication at a first wireless device in a wireless communication system is described. The apparatus may include a processor, memory coupled with the processor, and instructions stored in the memory. The instructions may be executable by the processor to cause the apparatus to receive, from a second wireless device, control signaling indicating that a message is to be simultaneously transmitted from the second wireless device and from a third wireless device to the first wireless device, determine a set of beamforming parameters for simultaneously receiving the message based on the control signaling indicating that the message is to be simultaneously transmitted, and simultaneously receive the message from the second wireless device and the third wireless device based on determining the set of beamforming parameters, where the message is received from the second wireless device on a first lobe of a directional beam and from the third wireless device on a second lobe of the directional beam different from the first lobe.

Another apparatus for wireless communication at a first wireless device in a wireless communication system is described. The apparatus may include means for receiving, from a second wireless device, control signaling indicating that a message is to be simultaneously transmitted from the second wireless device and from a third wireless device to the first wireless device, means for determining a set of beamforming parameters for simultaneously receiving the message based on the control signaling indicating that the message is to be simultaneously transmitted, and means for simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe.

A non-transitory computer-readable medium storing code for wireless communication at a first wireless device in a wireless communication system is described. The code may include instructions executable by a processor to receive, from a second wireless device, control signaling indicating that a message is to be simultaneously transmitted from the second wireless device and from a third wireless device to the first wireless device, determine a set of beamforming parameters for simultaneously receiving the message based on the control signaling indicating that the message is to be simultaneously transmitted, and simultaneously receive the message from the second wireless device and the third wireless device based on determining the set of beamforming parameters, where the message is received from the second wireless device on a first lobe of a directional beam and from the third wireless device on a second lobe of the directional beam different from the first lobe.

Some examples of the method, apparatuses, and non-transitory computer-readable medium described herein may further include operations, features, means, or instructions for transmitting, to the second wireless device, or the third wireless device, or both, a second message indicating a difference between a first gain associated with the first lobe of the directional beam and a second gain associated with the second lobe of the directional beam, where simultaneously receiving the message may be based on the difference between the first gain and the second gain.

In some examples of the method, apparatuses, and non-transitory computer-readable medium described herein, the set of beamforming parameters includes a set of beamforming weights used to generate the first lobe of the directional beam and the second lobe of the directional beam.

In some examples of the method, apparatuses, and non-transitory computer-readable medium described herein, the wireless communication system includes a single-frequency network (SFN) and the second wireless device and the third wireless device each include a transmission/reception point (TRP) in the SFN.

A method for wireless communication at a first wireless device is described. The method may include receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device, determining an operating mode for communicating the message based on the control signaling indicating whether to simultaneously communicate the message, and communicating the message according to the determined operating mode.

An apparatus for wireless communication at a first wireless device is described. The apparatus may include a processor, memory coupled with the processor, and instructions stored in the memory. The instructions may be executable by the processor to cause the apparatus to receive control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device, determine an operating mode for communicating the message based on the control signaling indicating whether to simultaneously communicate the message, and communicate the message according to the determined operating mode.

Another apparatus for wireless communication at a first wireless device is described. The apparatus may include means for receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device, means for determining an operating mode for communicating the message based on the control signaling indicating whether to simultaneously communicate the message, and means for communicating the message according to the determined operating mode.

A non-transitory computer-readable medium storing code for wireless communication at a first wireless device is described. The code may include instructions executable by a processor to receive control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device, determine an operating mode for communicating the message based on the control signaling indicating whether to simultaneously communicate the message, and communicate the message according to the determined operating mode.

Some examples of the method, apparatuses, and non-transitory computer-readable medium described herein may further include operations, features, means, or instructions for transmitting a second message indicating a first direction of the first lobe and a second direction of the second lobe, the second direction different from the first direction, where the control signaling indicating whether to simultaneously communicate the message may be based on the first direction and the second direction.

In some examples of the method, apparatuses, and non-transitory computer-readable medium described herein, the control signaling indicating whether to simultaneously communicate the message may be based on whether a first signal strength associated with communicating using the first lobe satisfies a first signal strength threshold and whether a second signal strength associated with communicating using the second lobe satisfies a second signal strength threshold.

In some examples of the method, apparatuses, and non-transitory computer-readable medium described herein, determining the operating mode may include operations, features, means, or instructions for selecting the operating mode to simultaneously communicate the message using the first lobe and the second lobe based on the control signaling indicating to simultaneously communicate the message.

In some examples of the method, apparatuses, and non-transitory computer-readable medium described herein, determining the operating mode may include operations, features, means, or instructions for selecting the operating mode to communicate the message to the second wireless device or the third wireless device using a first lobe of a second directional beam different from the directional beam based on the control signaling indicating not to simultaneously communicate the message.

In some examples of the method, apparatuses, and non-transitory computer-readable medium described herein, the control signaling indicating whether to simultaneously communicate the message may be based on an operating frequency of the first wireless device, an inter-antenna element spacing of an antenna array of the first wireless device, a quantity of antenna elements of the antenna array, an elemental gain pattern of a representative antenna element of the antenna array, a peak elemental gain of the representative antenna element, a geometry of the antenna array, or a combination thereof.

In some examples of the method, apparatuses, and non-transitory computer-readable medium described herein, the control signaling includes layer 1 (L1) signaling, layer 2 (L2) signaling, radio resource control (RRC) signaling, or a combination thereof.

A method for wireless communication at a first wireless device is described. The method may include determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device and transmitting, to the second wireless device, control signaling indicating whether to simultaneously transmit the message based on the determination.

An apparatus for wireless communication at a first wireless device is described. The apparatus may include a processor, memory coupled with the processor, and instructions stored in the memory. The instructions may be executable by the processor to cause the apparatus to determine whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device and transmit, to the second wireless device, control signaling indicating whether to simultaneously transmit the message based on the determination.

Another apparatus for wireless communication at a first wireless device is described. The apparatus may include means for determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device and means for transmitting, to the second wireless device, control signaling indicating whether to simultaneously transmit the message based on the determination.

A non-transitory computer-readable medium storing code for wireless communication at a first wireless device is described. The code may include instructions executable by a processor to determine whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device and transmit, to the second wireless device, control signaling indicating whether to simultaneously transmit the message based on the determination.

In some examples of the method, apparatuses, and non-transitory computer-readable medium described herein, the control signaling indicates the second wireless device may be to switch operating frequencies based on determining that the simultaneous transmission of the message will cause interference at the first wireless device.

In some examples of the method, apparatuses, and non-transitory computer-readable medium described herein, determining whether the simultaneous transmission of the message will cause interference may include operations, features, means, or instructions for determining whether the simultaneous transmission of the message will cause interference based on a second indication of a first direction of the first lobe of the directional beam, a signal strength associated with the first lobe of the directional beam, an operating frequency of the second wireless device, an inter-antenna element spacing of an antenna array of the second wireless device, a quantity of antenna elements of the antenna array, an elemental gain pattern of a representative antenna element of the antenna array, a peak elemental gain of the representative antenna element, a geometry of the antenna array, or a combination thereof.

DETAILED DESCRIPTION

Figure 1:
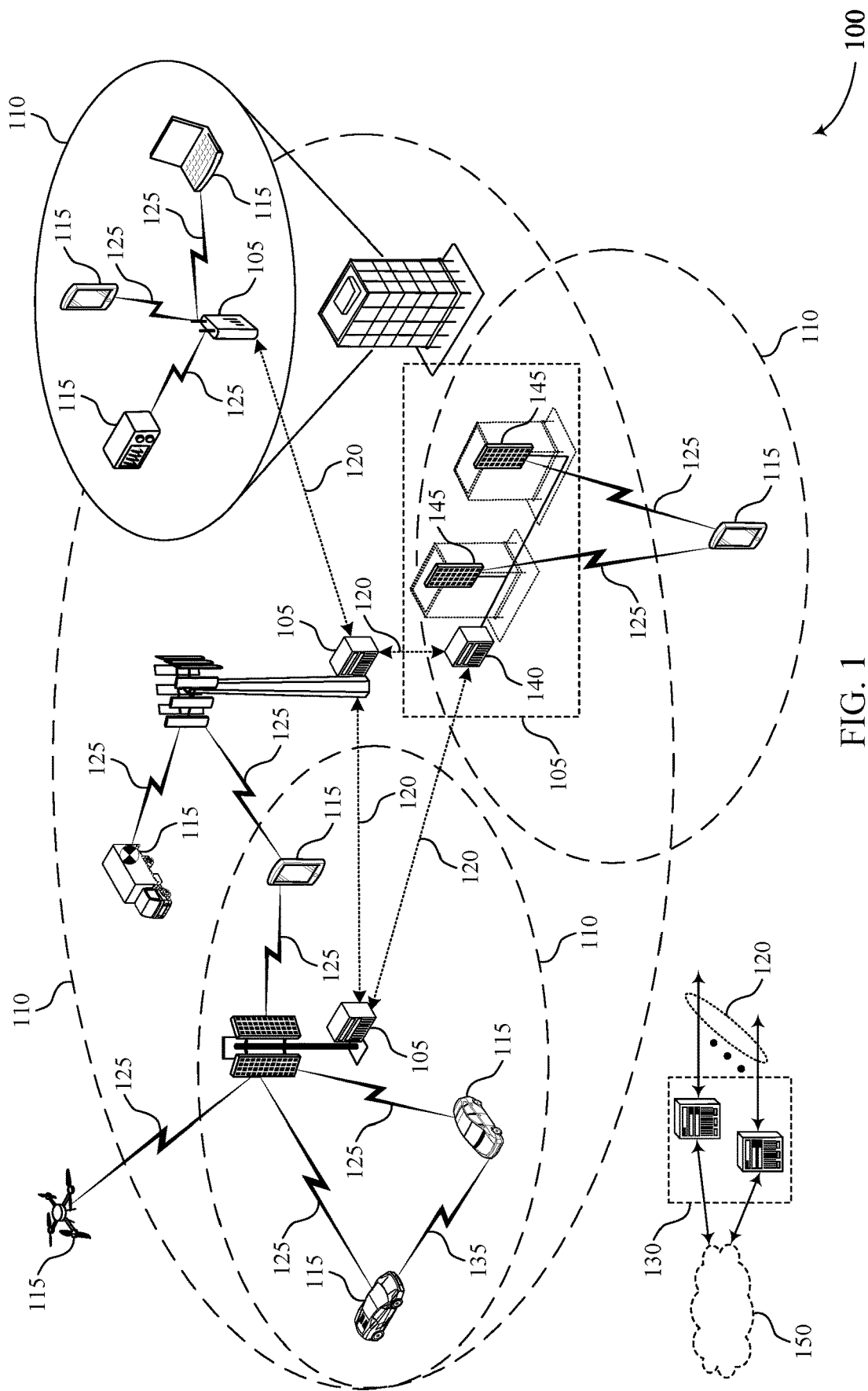
FIGS. 1, 2, 3A, and 3B illustrate examples of wireless communications systems that support techniques for communications on grating lobes in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, communication devices may support millimeter wave (mmW) communications (e.g., communications in a millimeter band from 30 gigahertz (GHz) to 300 GHz) over relatively wide bandwidths (e.g., a 14 GHz bandwidth or some other bandwidth). In some cases, these wide bandwidths may be referred to as ultrawide bandwidths.

In some cases, communications at various frequencies across an ultrawide bandwidth may suffer performance degradation and decreased reliability. For example, an array response of an antenna array of a communication device may change across the ultrawide bandwidth (e.g., due to a fixed inter-antenna element spacing of the antenna array), thereby causing directional beams to operate differently at different frequencies. One consequence of communicating over the ultrawide bandwidth is the creation of grating lobes in addition to a main lobe of a directional beam, where a grating lobe is defined as a lobe of a directional beam with gain close to or comparable with the gain of the main lobe, but pointing in a different direction. For example, the grating lobe may have a same gain as the main lobe without considering an antenna elemental gain pattern and may represent the spatial aliasing of the main lobe as the inter-antenna element spacing becomes large relative to half a wavelength of the carrier frequency of interest. Due to the relatively high gain of grating lobes, grating lobes may cause interference (e.g., to other signals) in unintended directions, thereby reducing reliability and performance of a wireless communications system.

Techniques, systems, and devices are described herein to advantageously use grating lobes to simultaneously communicate messages. For example, a first communication device (e.g., a UE, a base station) may determine the directions corresponding to a main lobe and one or more grating lobes of a same directional beam based on operating frequency, inter-antenna element spacing of an antenna array of the first communication device, a geometry of the antenna array, an elemental gain pattern function associated with an antenna element of the antenna array, or a combination thereof, among other factors. Accordingly, the first communication device may determine whether it may simultaneously transmit a message to multiple communication devices on the main lobe and one or more grating lobes of the directional beam. The first communication device may transmit control signaling to a second communication device indicating the transmission of the message on the grating lobe. The first communication device may determine a set of beamforming parameters (e.g., beam weights) that will generate the main lobe in the direction of a third communication device and generate the grating lobe in the direction of the second communication device. The first communication device may simultaneously transmit the message to a third communication device on the main lobe and to the second communication device on the grating lobe. Additionally, or alternatively, the first communication device may simultaneously receive a message on a main lobe and a grating lobe of a directional beam. For example, the first communication device may receive the message from the second communication device on the main lobe and may simultaneously receive the message from the third communication device on the grating lobe.

Additionally, or alternatively, a communication device may transmit the control signaling to indicate whether to simultaneously communicate a message using a main lobe and one or more grating lobes of a directional beam. For example, if a grating lobe of the first communication device will cause interference at the second communication device, the second communication device may transmit control signaling that indicates the first communication device to switch operating frequencies such that the gain or signal strength associated with the grating lobe in the direction of the second wireless device is reduced or eliminated.

Aspects of the subject matter described in this disclosure may be implemented to realize one or more of the following potential improvements, among others. The techniques employed by the communication devices may provide benefits and enhancements to the operation of the communication devices. For example, operations performed by the communication devices may provide improvements to mmW communications over ultrawide bandwidths. In some examples, transmitting control signaling to indicate simultaneous communication of messages using grating lobes may increase coordination between communication devices, coverage, and reliability. In some other examples, simultaneously communicating messages using the main lobe and grating lobes of directional beams may provide improvements to latency, power consumption, resource usage, and spectral efficiency, among other benefits.

Aspects of the disclosure are initially described in the context of wireless communications systems. Aspects of the disclosure are additionally described in the context of process flows. Aspects of the disclosure are further illustrated by and described with reference to apparatus diagrams, system diagrams, and flowcharts that relate to techniques for communications on grating lobes.

FIG. 1 illustrates an example of a wireless communications system 100 that supports techniques for communications on grating lobes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay/sidelink devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time-division duplexing systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal blocks (SSBs) on respective directional beams, where one or more SSBs may be included within an synchronization signal burst or synchronization signal burst set.

A quasi co-location (QCL) relationship between one or more transmissions or signals may refer to a relationship between the antenna ports (and the corresponding signaling beams) of the respective transmissions. For example, one or more antenna ports may be implemented by a base station 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power, etc.) transmitted on a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficient identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a transmission configuration indication (TCI) state configuration may include one or more parameters associated with a QCL relationship between transmitted signals. For example, a base station 105 may configure a QCL relationship that provides a mapping between a reference signal and antenna ports of another signal (e.g., a demodulation reference signal (DMRS) antenna port for PDCCH, a DMRS antenna port for PDSCH, a CSI-RS antenna port for CSI-RS, or the like), and the TCI state may be indicated to the UE 115 by the base station 105. In some cases, a set of TCI states may be indicated to a UE 115 via radio resource control (RRC) signaling, where some number of TCI states (e.g., a pool of 8 TCI states from of a total of 64 TCI states may be configured via RRC) and a particular TCI state may be indicated via downlink control information (DCI) (e.g., within a control resource set (CORESET)). The QCL relationship associated with the TCI state (and further established through higher-layer parameters) may provide the UE 115 with the QCL relationship for respective antenna ports and reference signals transmitted by the base station 105.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support mmW communications over ultrawide bandwidths. In some cases, communicating across an ultrawide bandwidth may create one or more grating lobes of a directional beam, which may cause interference in unintended directions. However, in some cases, the direction of the grating lobe may be known or predictable, for example, based on the frequency used for communication with another device. As such, a device in wireless communications system 100 may use a grating lobe to enable simultaneous communications with another device over both a main lobe and a grating lobe (e.g., by configuration one or more beamforming parameters and performing). That is, grating lobes may be used by a device for simultaneous beam scanning in multiple directions.

Various aspects of the described techniques support control signaling that enables the communication of messages on grating lobes of directional beams, thereby reducing latency, increasing coverage, and reducing interference cause by grating lobes due to increased coordination between communication devices. For example, a UE 115 or a base station 105 may determine whether it may simultaneously transmit a message to multiple communication devices (e.g., UEs 115, base stations 105) on a main lobe and one or more grating lobes of a directional beam. Based on the determination, the UE 115 or the base station 105 may transmit, to a second communication device, control signaling that indicates the transmission of the message on a grating lobe of the directional beam. The UE 115 or the base station 105 may determine a set of beamforming parameters for simultaneously transmitting the message to the second communication device and a third communication device. The UE 115 or the base station 105 may simultaneously transmit the message to third device on the main lobe and to the second communication device on the grating lobe. Additionally, or alternatively, the UE 115 or the base station 105 may simultaneously receive a message on the main lobe and the grating lobe. The UE 115 or the base station 105 may also communicate control signaling that indicates whether the UE 115, the base station 105, or another communication device is to simultaneously communicate the message on the main lobe and the grating lobe. It is noted that the signaling over the main lobe and the grating lobe may not be limited to one or more messages between devices, and any type of signal or signals may be simultaneously transmitted using the main lobe and grating lobe using the techniques described herein.

Figure 2:
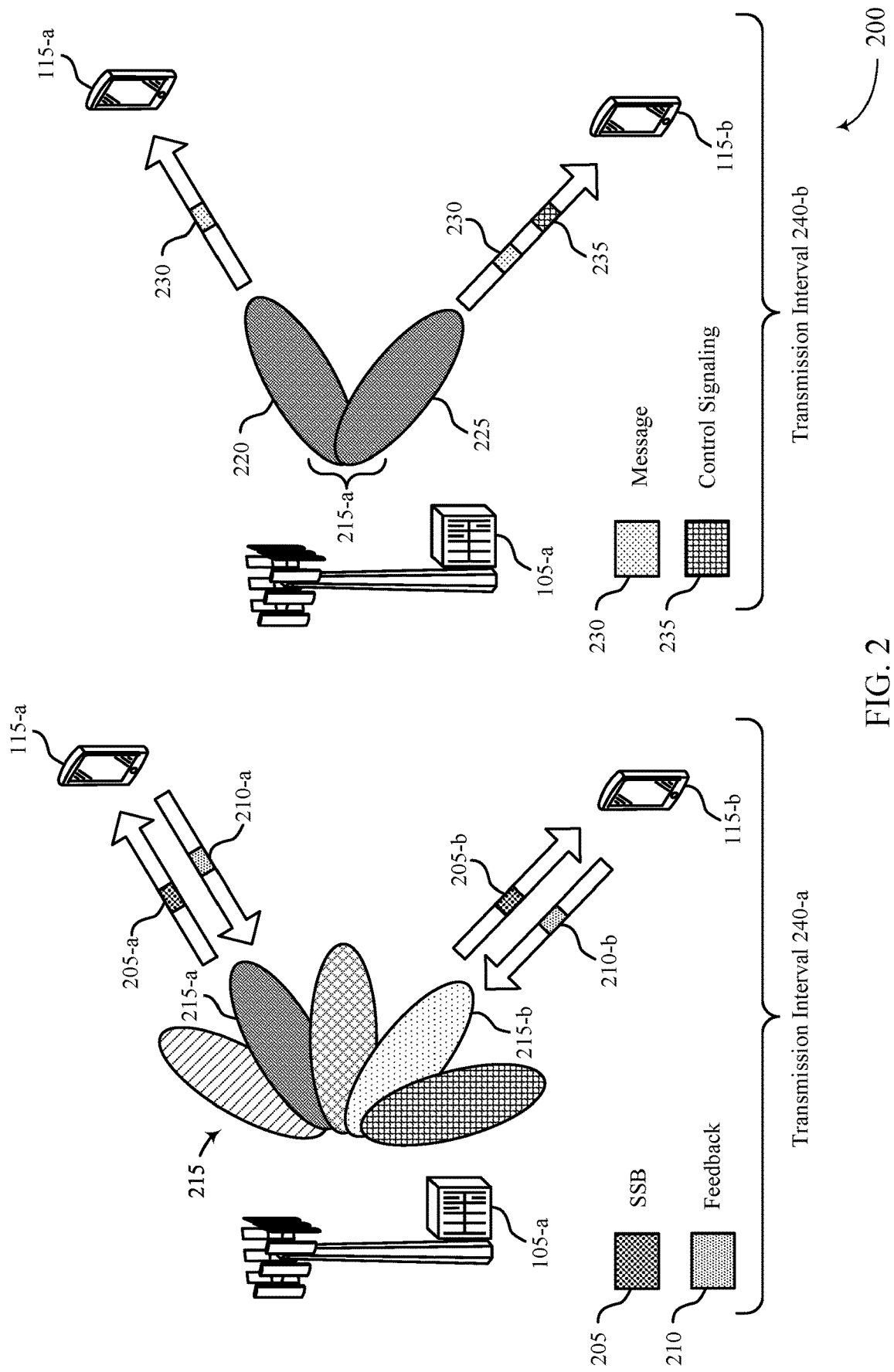

FIG. 2 illustrates an example of a wireless communications system 200 that supports techniques for communications on grating lobes in accordance with aspects of the present disclosure. In some examples, the wireless communications system 200 may implement aspects of the wireless communications system 100. For example, the wireless communications system 200 may include a base station 105-a, a UE 115-a, and a UE 115-b, which may be examples of a base station 105 and a UE 115 as described with reference to FIG. 1. In some examples, the wireless communications system 200 may support one or more RATs including 4G systems such as LTE systems, LTE-A systems, or LTE-A Pro systems, 5G systems which may be referred to as NR systems, or a combination of these or other radio access technologies. In some cases, the base station 105-a may utilize multiple lobes of a directional beam to simultaneously transmit a message to the UE 115-a and the UE 115-b.

The base station 105-a, the UE 115-a, and the UE 115-b may support mmW communications over an ultrawide bandwidth. Additionally, the base station 105-a, the UE 115-a, and the UE 115-b may support directional communications over the ultrawide bandwidth using beamforming techniques. In some cases, beamforming over the ultrawide bandwidth may create grating lobes. For example, the base station 105-a, the UE 115-a, and the UE 115-b may each include a radio frequency chain (e.g., an antenna array and associated radio frequency circuitry such as analog to digital converters, digital to analog converters, mixers, or down-converters, among other radio frequency circuitry) that is optimized for a particular frequency of the ultrawide bandwidth. For example, an inter-antenna element spacing of a respective antenna array may be fixed and tuned for communicating at the particular frequency. In some examples, communicating (e.g., operating) at some frequencies of the ultrawide bandwidth different from the particular frequency may create one or more grating lobes of a directional beam in addition to a main lobe of the directional beam.

Characteristics of grating lobes and main lobes of directional beams may be determined based on various parameters. For example, directions and gains corresponding to a grating lobe and a main lobe of a directional beam may be determined based on operating frequency, the inter-antenna element spacing, a geometry of the radio frequency chain (e.g., a quantity of antenna elements of the antenna array, a structure of the radio frequency chain such as a linear structure or a planar structure), an elemental gain pattern associated with the radio frequency chain (e.g., an elemental gain pattern of a representative antenna of the antenna array), a peak elemental gain of the representative antenna element, or a combination thereof, among other parameters.

For example, in some cases, a peak gain direction $\theta$ of a main lobe of a directional beam nominally steered at some angle $\theta_o$ may be determined by:

$$\theta = \sin^{-1}(\sin(\theta_o)/x) \quad (1)$$

where $x = 2d/\lambda$, $d$ is the inter-antenna element spacing of the antenna array, and $\lambda$ is the operating wavelength. In some examples, peak gain directions $\phi$ of grating lobes of a directional beam may be determined within a coverage region of the directional beam by:

$$\phi = \sin^{-1}([\sin(\theta_o) - 2n]/x) \quad (2)$$

where n is some non-zero integer. Because the inter-antenna element spacing d of the antenna array is fixed (e.g., based on, for example, a hardware configuration), the operating wavelength $\lambda$ and beam steering angle $\theta_o$ may determine whether grating lobes are created. In some examples, one or more grating lobes may be created for any $\theta_o$ if $\lambda$ is such that $d \geq \lambda$. In some cases, no grating lobes may be created for any $\theta_o$ if $\lambda$ is such that $d \leq \lambda/2$. In some examples, if $\lambda$ is such that $\lambda/2 \leq d \leq \lambda$, some $\theta_o$ may create one or more grating lobes (e.g., $\theta_o$ towards the edge of the coverage region of the antenna array such as the end-fire directions and their neighborhood).

The example of FIG. 2 depicts the wireless communications system 200 operating during a first transmission interval 240-a. In some examples, the transmission interval 240-a may represent an interval of time in which the base station 105-a performs a beam management procedure to select base station directional beams 215 to use to communicate with the UE 115-a and the UE 115-b, respectively. To perform the beam management procedure, the base station 105-a may use beam sweeping techniques to transmit SSBs 205 in multiple directions using multiple base station directional beams 215. For example, the base station 105-a may transmit an SSB 205 in each base station directional beam 215 of a set of base station directional beams 215, where each base station directional beam 215 points in a different direction (is steered to a different $\theta_o$). In some examples, the base station 105-a may transmit each SSB 205 at a frequency such that no grating lobes are created (e.g., on a primary carrier of the ultrawide bandwidth).

The UE 115-a and the UE 115-b may each measure the SSBs 205 transmitted in the base station directional beams 215 and may each select, based on the measured SSBs 205, a base station directional beam 215 for the base station 105-a to use to transmit downlink messages to the UE 115-a and the UE 115-b, respectively. For example, the UE 115-a may receive the SSB 205-a on the base station directional beam 215-a, measure the SSB 205-a, and select the base station directional beam 215-a based on the measurement. In some examples, the UE 115-a may select the base station directional beam 215-a based on measuring that a signal strength associated with the base station directional beam 215-a is greater than a signal strength associated with other base station directional beams 215 of the set. Additionally, the UE 115-b may receive the SSB 205-b on the base station directional beam 215-b, measure the SSB 205-b, and select the base station directional beam 215-b based on the measurement.

The UE 115-a and the UE 115-b may transmit feedback 210 to the base station 105-a at least to indicate the respectively selected base station directional beams 215. For example, the UE 115-a may transmit the feedback 210-a that includes a TCI state configuration corresponding to the base station directional beam 215-a. Additionally, or alternatively, the UE 115-a may include in the feedback 210-a one or more SSB indices corresponding to a subset of base station directional beams 215 having relatively higher signal strengths (e.g., reference signal received power levels), a first indication of whether a signal strength of the base station directional beam 215-a satisfies a first signal strength threshold, or a combination thereof. The UE 115-b may transmit the feedback 210-b that includes a TCI state configuration corresponding to the base station directional beam 215-b, one or more SSB indices corresponding to a subset of base station directional beams 215 having relatively higher signal strengths, a second indication of whether a signal strength of the base station directional beam 215-b satisfies a second signal strength threshold, or a combination thereof. Based on receiving the feedback 210-a and the feedback 210-b, the base station 105-a may determine to communicate with the UE 115-a using the base station directional beam 215-a and with the UE 115-b using the base station directional beam 215-b.

The example of FIG. 2 additionally depicts the wireless communications system 200 operating during a second transmission interval 240-b. The transmission interval 240-b may represent an interval of time in which the base station 105-a performs operations to simultaneously transmit a message 230 on a main lobe 220 of the base station directional beam 215-a and a grating lobe 225 of the base station directional beam 215. In some examples, the base station 105-a, the UE 115-a, and the UE 115-b may perform the operations depicted in the transmission interval 240-b after performing the beam management procedure in the transmission interval 240-a. In some examples, the base station 105-a, the UE 115-a, and the UE 115-b may perform the operations depicted in the transmission interval 240-*b* one or more times before performing the beam management procedure in the transmission interval 240-*a* again. For example, the base station 105-*a*, the UE 115-*a*, and the UE 115-*b* may perform the beam management procedure dynamically (e.g., based on a trigger causing a beam switch), periodically, or semi-persistently, and between performing the beam management procedures, the base station 105-*a* may simultaneously transmit messages 230 multiple times to the UE 115-*a*, the UE 115-*b*, additional UEs 115 (not shown), or a combination thereof.

To simultaneously transmit the message 230 to the UE 115-*a* and the UE 115-*b*, the base station 105-*a* may determine whether it may generate a main lobe and a grating lobe of a base station directional beam 215 in the respective directions of the UE 115-*a* and the UE 115-*b*. In some examples, the base station 105-*a* may additionally determine whether a respective signal strength of both the main lobe and the grating lobe satisfies a respective signal strength threshold. The base station 105-*a* may determine the directions and gains of the main lobe and the grating lobe according to the techniques described herein. In the example of FIG. 2, the base station 105-*a* may determine that it may use a set of beamforming parameters (e.g., beam weights) to generate a grating lobe 225 of the base station directional beam 215-*a* in the direction of the UE 115-*b*. For example, the base station 105-*a* may determine that it may communicate with the UE 115-*b* using the base station directional beam 215-*b* based on the feedback 210-*b* provided by the UE 115-*d* during the beam management procedure. Accordingly, by creating a grating lobe 225 that corresponds to the direction of the base station directional beam 215-*b*, the base station 105-*a* may transmit a message 230 to the UE 115-*b* on the grating lobe 225. In some examples, the base station 105-*a* may generate the grating lobe 225 by transmitting the message 230 on a frequency such that grating lobes may be generated (e.g., on a secondary carrier of the ultrawide bandwidth). Here, the base station 105-*a* may transmit the message 230 on a frequency different from the frequency at which the SSBs 205 were transmitted.

The base station 105-*a* may transmit control signaling 235 to the UE 115-*b* to indicate the transmission of the message 230 on the grating lobe 225. Here, the base station 105-*a* may transmit the control signaling using the base station directional beam 215-*b*. In some cases, the control signaling 235 may indicate resources (e.g., in a time domain and a frequency domain) that the base station 105-*a* will use to transmit the message 230. In some cases, the base station 105-*a* may indicate a directional beam for the UE 115-*b* to use to receive the message 230 on the grating lobe 225. For example, the control signaling may include a QCL indication that indicates the directional beam for the UE 115-*b* to use. In some examples, the base station 105-*a* may transmit the control signaling 235 in layer 1 (L1) signaling, layer 2 (L2) signaling, RRC signaling, or a combination thereof. Because the base station 105-*a* will transmit the message 230 the UE 115-*a* on a main lobe 220 of the base station directional beam 215-*a*, the base station 105-*a* may not transmit the control signaling 235 to the UE 115-*a*.

The base station 105-*a* may determine the set of beamforming parameters that will generate the main lobe 220 in the direction of the UE 115-*a* and the grating lobe 225 in the direction of the UE 115-*b*. Additionally, the UE 115-*b* may determine a second set of beamforming parameters to receive the message 230 on the grating lobe 225 based on receiving the control signaling 235 (e.g., based on the QCL indication). The base station 105-*a* may then simultaneously transmit the message 230 to the UE 115-*a* on the main lobe 220 and to the UE 115-*b* on the grating lobe 225. In some examples, a first gain of the main lobe 220 and a second gain of the grating lobe 225 may be different. The base station 105-*a* may determine a gain differential or the difference in gain between the first gain and the second gain and may adjust its transmission power to compensate for the difference. For example, if the second gain is less than the first gain, the base station 105-*a* may increase its transmission power so that a signal strength associated with the grating lobe satisfies an associated signal strength threshold. In some examples, the message 230 may be a downlink data message transmitted on a physical downlink shared channel (PDSCH). In some other examples, the message 230 may include one or more channel state information-reference signals, one or more tracking reference signals, or a combination thereof.

It is noted that for illustrative purposes, FIG. 2 depicts the base station 105-*a* simultaneously transmitting the message 230 to two UEs 115, however the principles disclosed herein may be adapted and applied for the base station 105-*a* to simultaneously transmit the message 230 to any number of UEs 115 on respective lobes of a directional beam.

Figure 3A:
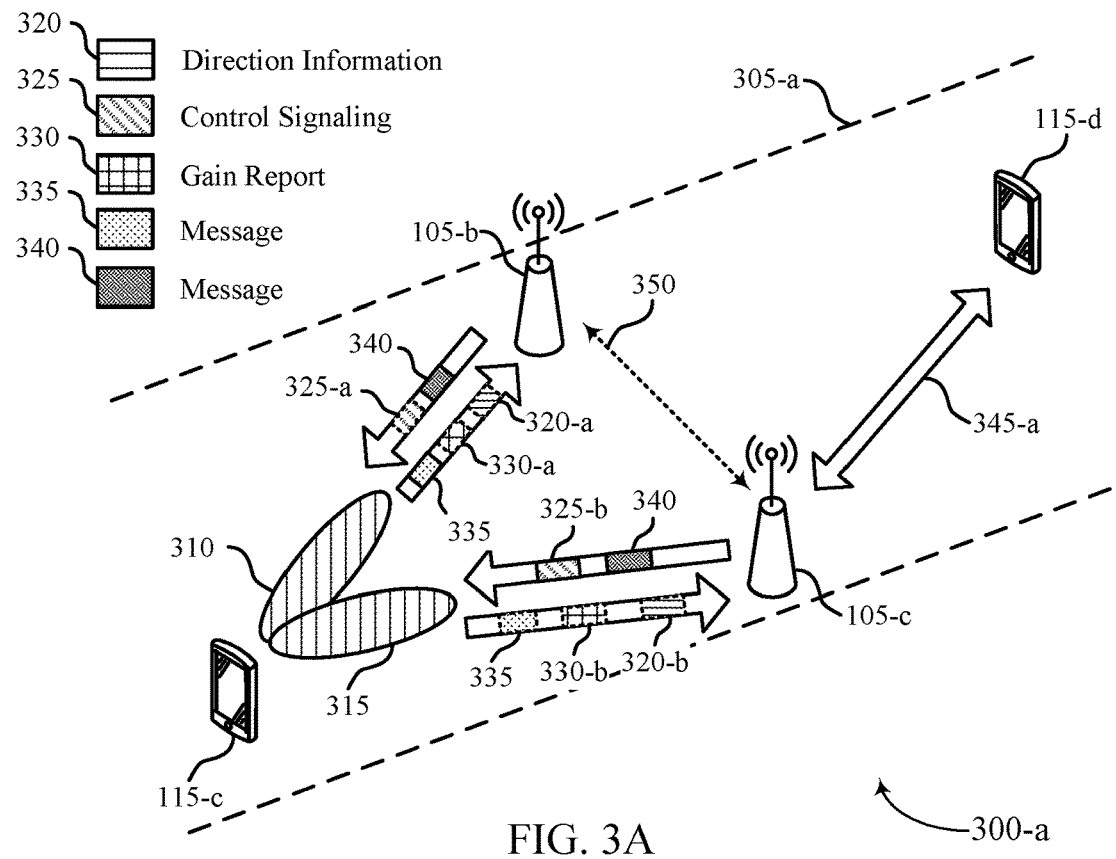

FIG. 3A illustrates an example of a wireless communications system 300-*a* that supports techniques for communications on grating lobes in accordance with aspects of the present disclosure. In some examples, the wireless communications system 300-*a* may implement aspects of a wireless communications system 100 or 200 as described with reference to FIGS. 1 and 2. For example, the wireless communications system 300-*a* may include a base station 105-*b*, a base station 105-*c*, a UE 115-*c*, and a UE 115-*d*, which may be examples of a base station 105 and a UE 115 as described with reference to FIGS. 1 and 2. In some examples, the wireless communications system 300-*a* may be an example of a single-frequency network (SFN) in which several transmitters (e.g., base stations 105) simultaneously send a same signal to a same UE 115 over a same frequency channel. In some cases, SFNs may be used to support communications at high speeds. For example, in some cases, the wireless communications system 300-*a* may be an example of an SFN deployment that supports communications on high speed train (HST) tracks 305-*a*. Here, the base station 105-*b* and the base station 105-*c* may be examples of a TRP 145 described with reference to FIG. 1.

The base station 105-*b*, the base station 105-*c*, the UE 115-*c*, and the UE 115-*d* may support mmW communications over an ultrawide bandwidth, which, in some cases, may cause one or more grating lobes of a directional beam to be created in addition to a main lobe of the directional beam. In the example of FIG. 3A, the UE 115-*c* may advantageously use one or more grating lobes 315 to simultaneously transmit a message 335 or receive a message 340.

To simultaneously transmit the message 335, the UE 115-*c*, the base station 105-*b*, or the base station 105-*c* may determine whether the UE 115-*c* may generate a main lobe 310 and a grating lobe 315 of a directional beam in the respective directions of the base station 105-*b* and the base station 105-*c*. In some examples, the UE 115-*c*, the base station 105-*b*, or the base station 105-*c* may additionally determine whether a first signal strength of the main lobe 310 satisfies a first signal strength threshold and whether a second signal strength of the grating lobe 315 satisfies a second signal strength threshold. In some cases, if the first signal strength satisfies the first signal strength threshold and the second signal strength satisfies the second signal strength threshold, the UE 115-*c*, the base station 105-*b*, or the base station 105-c may determine that the UE 115-c may simultaneously transmit the message 335 at an adequate signal strength to enable the base station 105-b and the base station 105-c to successfully receive the message 335.

In some examples, the base station 105-b or the base station 105-c may determine the first signal strength and the second signal strength based on direction information 320 transmitted by the UE 115-c. For example, the UE 115-c may determine the directions of the main lobe 310 and the grating lobe 315 using the techniques described herein. The UE 115-c may transmit direction information 320 that includes the directions of the main lobe 310 and the grating lobe 315 to the base station 105-b, or the base station 105-c, or both. For example, the base station 105-b and the base station 105-c may communicate with each other over a backhaul link 350. Accordingly, if the UE 115-c transmits the direction information 320-a to the base station 105-b, the base station 105-b may forward the direction information 320-a to the base station 105-c over the backhaul link 350. Alternatively, if the UE 115-c transmit the direction information 320-b to the base station 105-c, the base station 105-c may forward the direction information 320-b to the base station 105-b. If the UE 115-c transmits the direction information 320 to both the base station 105-b and the base station 105-c, the UE 115-c may transmit the direction information 320-a on a first directional beam and the direction information 320-b on a second directional beam different from the first directional beam. Based on the received direction information 320, the base station 105-b or the base station 105-c may determine the first signal strength and the second signal strength.

If the UE 115-c, the base station 105-b, or the base station 105-c determine that the UE 115-c may simultaneously transmit the message 335, the base station 105-b or the base station 105-c, or both, may transmit control signaling 325 (e.g., control signaling 325-a, control signaling 325-b) to the UE 115-c. The control signaling 325 may indicate whether the UE 115-c is to simultaneously transmit the message 335. For example, the base station 105-c may determine whether the simultaneous transmission of the message 335 will cause interference at the base station 105-c (or with one or more other devices in the wireless communications system 300-a). For example, the base station 105-c may communicate with the UE 115-d over a communication link 345-a (e.g., a communication link 125). Based on the determined direction of the grating lobe 315 and the second signal strength of the grating lobe 315, the base station 105-c may determine whether the grating lobe 315 will interfere with communications between the base station 105-c and the UE 115-d. In the example of FIG. 3A, the base station 105-c may determine that the grating lobe 315 may not interfere with communications between the base station 105-c and the UE 115-d. Accordingly, the base station 105-b or the base station 105-c, or both, may transmit the control signaling 325 to the UE 115-c indicating that the UE 115-c may simultaneously transmit the message 335 to the base station 105-b on the main lobe 310 and to the base station 105-c on the grating lobe 315.

In some examples, the control signaling 325 may indicate the time/frequency resources that the UE 115-c is to use to simultaneously transmit the message 335. In some examples, the base station 105-b, the base station 105-c, or both, may transmit the control signaling 325 in L1 signaling, L2 signaling, RRC signaling, or a combination thereof.

Prior to simultaneously transmitting the message 335, in some examples, the UE 115-c may transmit one or both of a gain report 330-a to the base station 105-b and a gain report 330-b to the base station 105-c. For example, the UE 115-c may determine a difference between a first gain of the main lobe 310 and a second gain of the grating lobe 315. The UE 115-c may then transmit a gain report 330 that indicates the difference in gain. In some examples, the gain report 330 includes the first gain and the second gain, and the base station 105-b, or the base station 105-c, or both, may compute the difference between the first gain and the second gain. Based on the difference in gain, the base station 105-b, or the base station 105-c, or both, may transmit an indication of a modulation and coding scheme (MCS) (e.g., included in the control signaling 325, included in additional control signaling 325 (not shown)) for transmitting the message 335.

The UE 115-c may determine a set of beamforming parameters (e.g., beam weights) that will generate the main lobe 310 and the grating lobe 315 based on the control signaling 325. In some examples, the UE 115-c may select the MCS for transmitting the message 335 based on receiving the indication of the MCS. The UE 115-c may additionally select an operating mode to transmit the message 335 based on the control signaling. For example, the operating mode may correspond to an operating frequency at which the main lobe 310 and the grating lobe 315 will be generated in the respective directions of the base station 105-b and the base station 105-c. The UE 115-c may then simultaneously transmit the message 335 to the base station 105-b on the main lobe 310 and to the base station 105-c on the grating lobe 315.

To simultaneously receive the message 340, the base station 105-b, the base station 105-c, or both may transmit the control signaling 325 to indicate that the message 340 is to be simultaneously received on the main lobe 310 and the grating lobe 315. In response to receiving the control signaling 325, the UE 115-c may transmit a gain report 330. Based on the gain report, the base station 105-b, the base station 105-c, or both, may adjust respective transmission powers for transmitting the message 340. For example, if the second gain of the grating lobe 315 is less than the first gain of the main lobe 310, the base station 105-c may increase a transmission power associated with transmitting the message 340 to compensate for the difference in gain.

The UE 115-c may determine the set of beamforming parameters that will generate the main lobe 310 and the grating lobe 315 in the respective directions of the base station 105-b and the base station 105-c. Then, the UE 115-c may receive simultaneously receive the message 340 from the base station 105-b on the main lobe 310 and from the base station 105-c on the grating lobe 315.

Figure 3B:
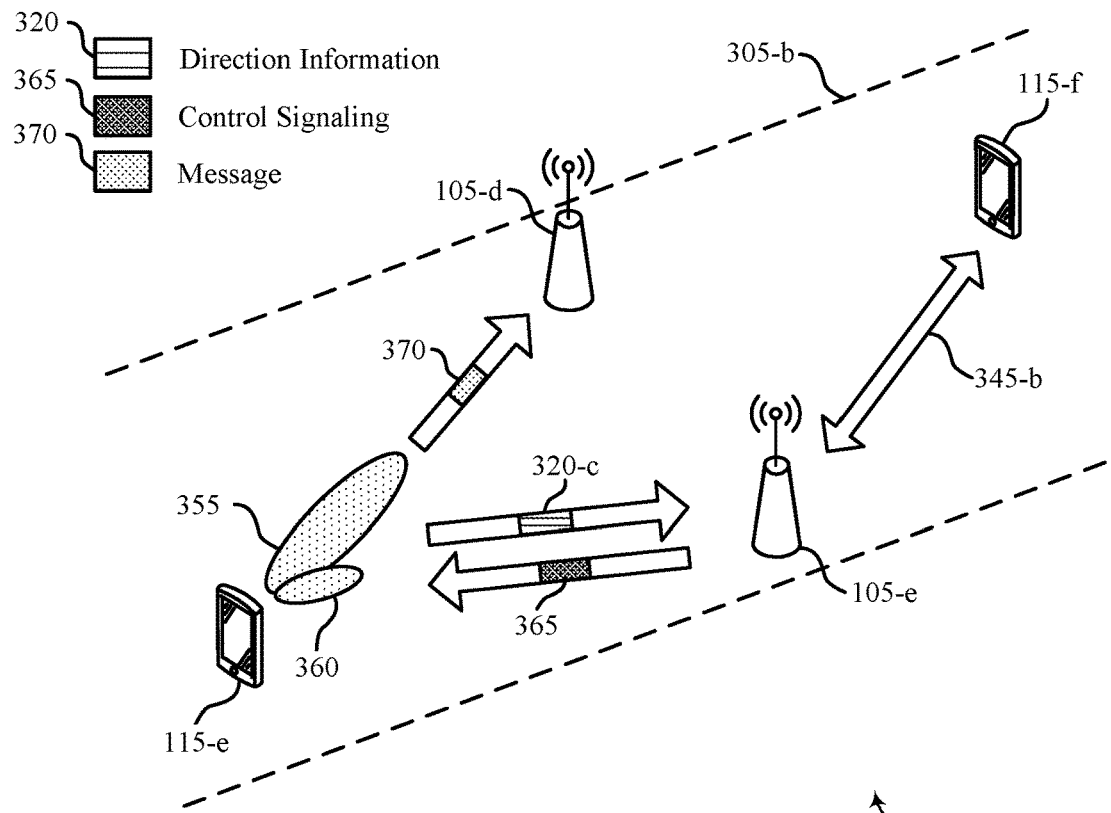

FIG. 3B illustrates an example of a wireless communications system 300-b that supports techniques for communications on grating lobes in accordance with aspects of the present disclosure. In some examples, the wireless communications system 300-b may implement aspects of a wireless communications system 100 or 200 as described with reference to FIGS. 1 and 2. For example, the wireless communications system 300-b may include a base station 105-d, a base station 105-e, a UE 115-e, and a UE 115-f, which may be examples of a base station 105 and a UE 115 as described with reference to FIGS. 1 through 3A. In some examples, the wireless communications system 300-b may be an example of an SFN. For example, in some cases, the wireless communications system 300-b may be an example of an SFN deployment that supports communications on HST tracks 305-b. Here, the base station 105-d and the base station 105-e may be examples of a TRP 145 described with reference to FIG. 1.

The base station 105-d, the base station 105-e, the UE 115-e, and the UE 115-f may support mmW communications over an ultrawide bandwidth, which, in some cases, may cause one or more grating lobes of a directional beam to be created in addition to a main lobe of the directional beam. In the example of FIG. 3B, the base station 105-e may determine that simultaneous transmission of a message 370 on a grating lobe of a directional beam generated by the UE 115-e will cause interference at the base station 105-e and may transmit control signaling 365 based on the determination.

For example, the base station 105-e may communicate with the UE 115-f over a communication link 345-b (e.g., a communication link 125). To determine whether the transmission of the message 370 on the grating lobe may interfere with communications between the base station 105-e and the UE 115-f, the base station 105-e may determine characteristics of the grating lobe. For example, the UE 115-e may transmit direction information 320-c that indicates a direction of the grating lobe. The base station 105-e may receive the direction information 320-c to determine whether the direction of the grating lobe corresponds to the direction of the base station 105-e and to determine a signal strength associated with the grating lobe as seen by the base station 105-e. If a signal strength of the grating lobe in the direction of the base station 105-e satisfies a signal strength threshold, the base station 105-e may determine that the transmission of the message 370 on the grating lobe will cause interference. Additionally, or alternatively, the base station 105-e may determine that the transmission of the message 370 will cause interference based on an operating frequency of the UE 115-e, an inter-antenna element spacing of the antenna array used in a radio frequency chain of the UE 115-e, a quantity of antenna elements used in the radio frequency chain, an elemental gain pattern of a representative antenna element of the antenna array, a geometry of the antenna array, or a combination thereof.

Based on determining that the grating lobe will cause interference, the base station 105-e may transmit control signaling 365 to the UE 115-e that indicates the UE 115-e to refrain from simultaneously transmitting the message 370 on a main lobe 355 of a directional beam and the grating lobe. For example, the control signaling 365 may indicate for the UE 115-e to select an operating mode such that the grating lobe (e.g., a signal strength of the grating lobe, a gain of the grating lobe) is reduced or eliminated in the direction of the base station 105-e. Here, selecting the operating mode may include selecting an operating frequency (e.g., switching to a different operating frequency) such that the grating lobe is reduced or eliminated. Accordingly, the UE 115-e may select the operating mode and transmit the message 370 to the base station 105-e on the main lobe 355. Here, the selected operating mode may generate a side lobe 360 in the direction of the base station 105-e that may not cause interference at the base station 105-e (or at one or more other wireless devices in wireless communications system 300-b).

Figure 4:
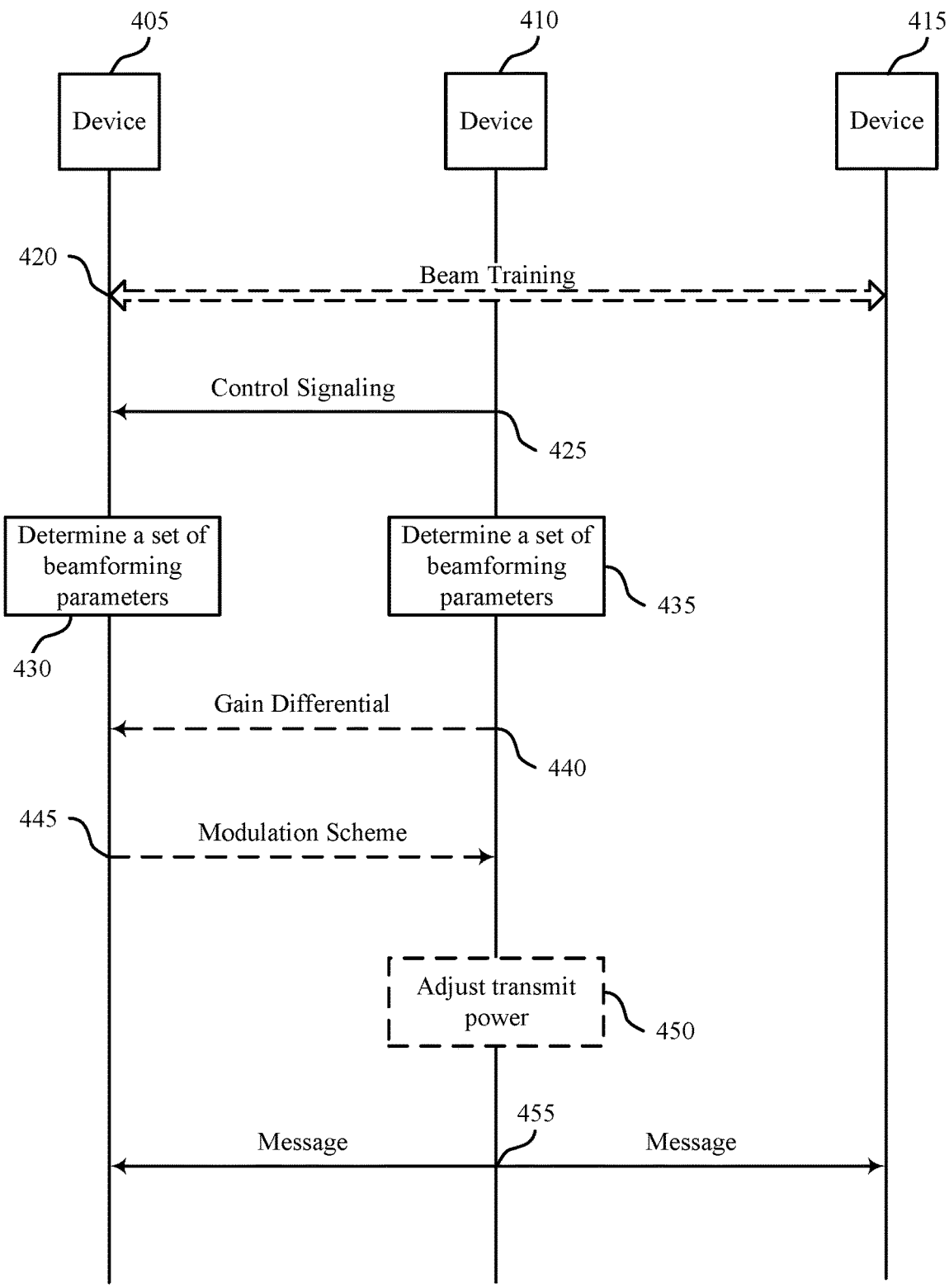
FIGS. 4 through 7 illustrate examples of process flows that support techniques for communications on grating lobes in accordance with aspects of the present disclosure.

FIG. 4 illustrates an example of a process flow 400 that supports techniques for communications on grating lobes in accordance with aspects of the present disclosure. In some examples, the process flow 400 may implement aspects of a wireless communications system 100 through 300-a as described with reference to FIGS. 1 through 3A. The process flow 400 may be implemented by a device 405, a device 410, and a device 415 to support simultaneous communication of messages using one or more grating lobes of a directional beam (e.g., in mmW systems). The process flow 400 may further be implemented by the devices 405, 410, and 415 to reduce latency, increase coverage, and increase coordination between the devices 405, 410, and 415, among other benefits.

The devices 405, 410, and 415 may be examples of a base station 105 or a UE 115, as described with reference to FIGS. 1 through 3A. In the following description of the process flow 400, the operations between the devices 405, 410, and 415 may be communicated in a different order than the example order shown, or the operations performed by the devices 405, 410, and 415 may be performed in different orders or at different times. Some operations may also be omitted from the process flow 400, and other operations may be added to the process flow 400.

At 420, the device 410 may perform a beam training procedure with the device 405 and the device 415. For example, the device 410 may transmit SSBs in different directions on different directional beams to the device 405 and the device 415. The device 405 and the device 415 may each select a preferred directional beam and transmit feedback to the device 410 that indicates the preferred directional beam.

At 425, the device 410 may transmit control signaling on a first directional beam to the device 405 (e.g., the preferred directional beam of the device 405) indicating that a message is to be transmitted using a grating lobe a second directional beam different from the first directional beam. For example, based on the received feedback, the device 410 may determine that it may generate a main lobe of the second directional beam in the direction of the device 415 and a grating lobe of the second directional beam in the direction of the device 405. Accordingly, the device 410 may determine to simultaneously transmit a message to the device 415 on the main lobe and to the device 405 on the grating lobe. In some examples, the control signaling may indicate a receive beam for the device 405 to use to receive the message on the grating lobe. In some cases, the control signaling may indicate the time/frequency resources to be used by the device 410 to transmit the message on the grating lobe.

At 430, the device 405 may determine a set of beamforming parameters to receive the message on the grating lobe in response to receiving the control signaling. For example, the device 405 may determine a set of beam weights corresponding to the indicated receive beam.

At 435, the device 410 may determine a set of beamforming parameters to simultaneously transmit the message on the main lobe and the grating lobe. For example, the device 410 may determine a set of beam weights that will generate the main lobe in the direction of the device 415 and the grating lobe in the direction of the device 405.

At 440, the device 410 may optionally transmit a gain differential to the device 405 that indicates a difference between a first gain of the main lobe and a second gain of the grating lobe.

At 445, the device 405 may optionally transmit, to the device 410, an indication of an MCS for simultaneously transmitting the message. For example, in response to the receiving the gain differential, the device 405 may select an MCS to compensate for at least some of the difference between the first gain and the second gain. The device 405 may then transmit the indication of the MCS.

At 450, the device 410 may optionally adjust a transmit power associated with simultaneously transmitting the message. For example, to compensate for the difference between the first gain and the second gain, the device 410 may increase the transmission power of the message. In this way, the device 410 may ensure that the message may be successfully received by the device 405 and the device 415.

At 455, the device 410 may simultaneously transmit the message to the device 415 on the main lobe and to the device 405 on the grating lobe.

Figure 5:
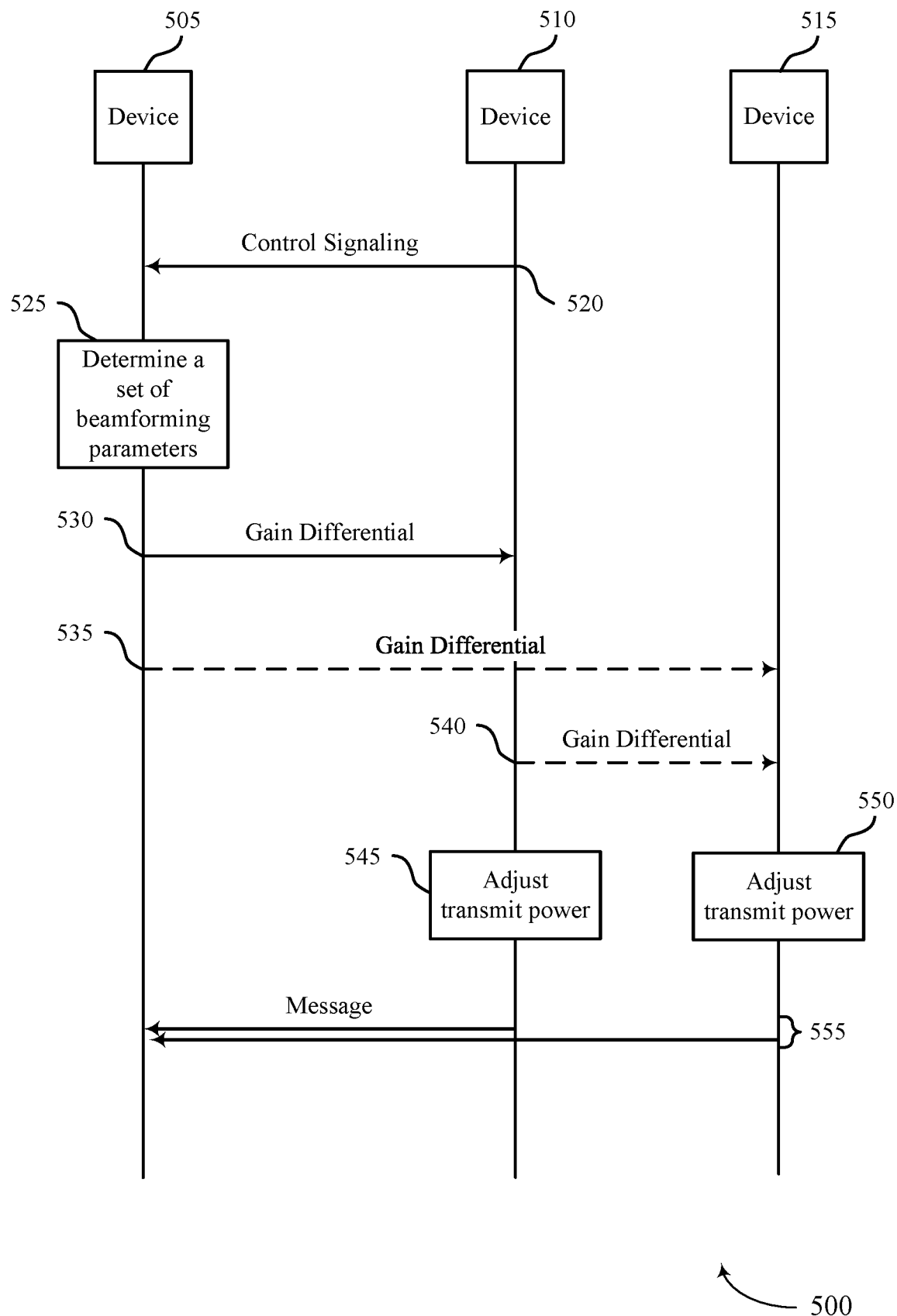

FIG. 5 illustrates an example of a process flow 500 that supports techniques for communications on grating lobes in accordance with aspects of the present disclosure. In some examples, the process flow 500 may implement aspects of a wireless communications system 100 through 300-a as described with reference to FIGS. 1 through 3A. The process flow 500 may be implemented by a device 505, a device 510, and a device 515 to support simultaneous communication of messages using one or more grating lobes of a directional beam (e.g., in mmW systems). The process flow 500 may further be implemented by the devices 505, 510, and 515 to reduce latency, increase coverage, and increase coordination between the devices 505, 510, and 515, among other benefits.

The devices 505, 510, and 515 may be examples of a base station 105 or a UE 115, as described with reference to FIGS. 1 through 3A. In the following description of the process flow 500, the operations between the devices 505, 510, and 515 may be communicated in a different order than the example order shown, or the operations performed by the devices 505, 510, and 515 may be performed in different orders or at different times. Some operations may also be omitted from the process flow 500, and other operations may be added to the process flow 500.

At 520, the device 505 may receive control signaling from the device 510 (e.g., and/or the device 515) indicating that a message is to be simultaneously transmitted from the device 510 and from the device 515. In some cases, the control signaling may indicate the time/frequency resources to be used by the device 510 and the device 515 to transmit the message.

At 525, the device 505 may determine a set of beamforming parameters for simultaneously receiving the message from the device 510 and the device 515. For example, the device 505 may determine a set of beam weights that will generate a main lobe of a directional beam in the direction of the device 510 and a grating lobe of the directional beam in the direction of the device 515 (e.g., or vice versa). In some examples, the directional beam may be different from a second directional beam used to receive the control signaling.

At 530, the device 505 may transmit a gain differential to the device 510 that indicates a difference between a first gain of the main lobe and a second gain of the grating lobe. At 535, the device 505 may optionally transmit the gain differential to the device 515. For example, in some cases, the device 510 and the device 515 may communicate over a backhaul link. Accordingly, if at 535, the device 505 does not transmit the gain differential to the device 515, at 540, the device 510 may forward the gain differential to the device 515 over the backhaul link.

At 545, the device 510 may adjust a transmit power of the device 510 for transmitting the message based on the gain differential (e.g., to compensate for the difference between the first gain and the second gain). At 550, the device 515 may adjust a transmit power of the device 515 for transmitting the message based on the gain differential.

At 555, the device 505 may simultaneously receive the message from the device 510 on the main lobe and from the device 515 on the grating lobe (e.g., or vice versa).

Figure 6:
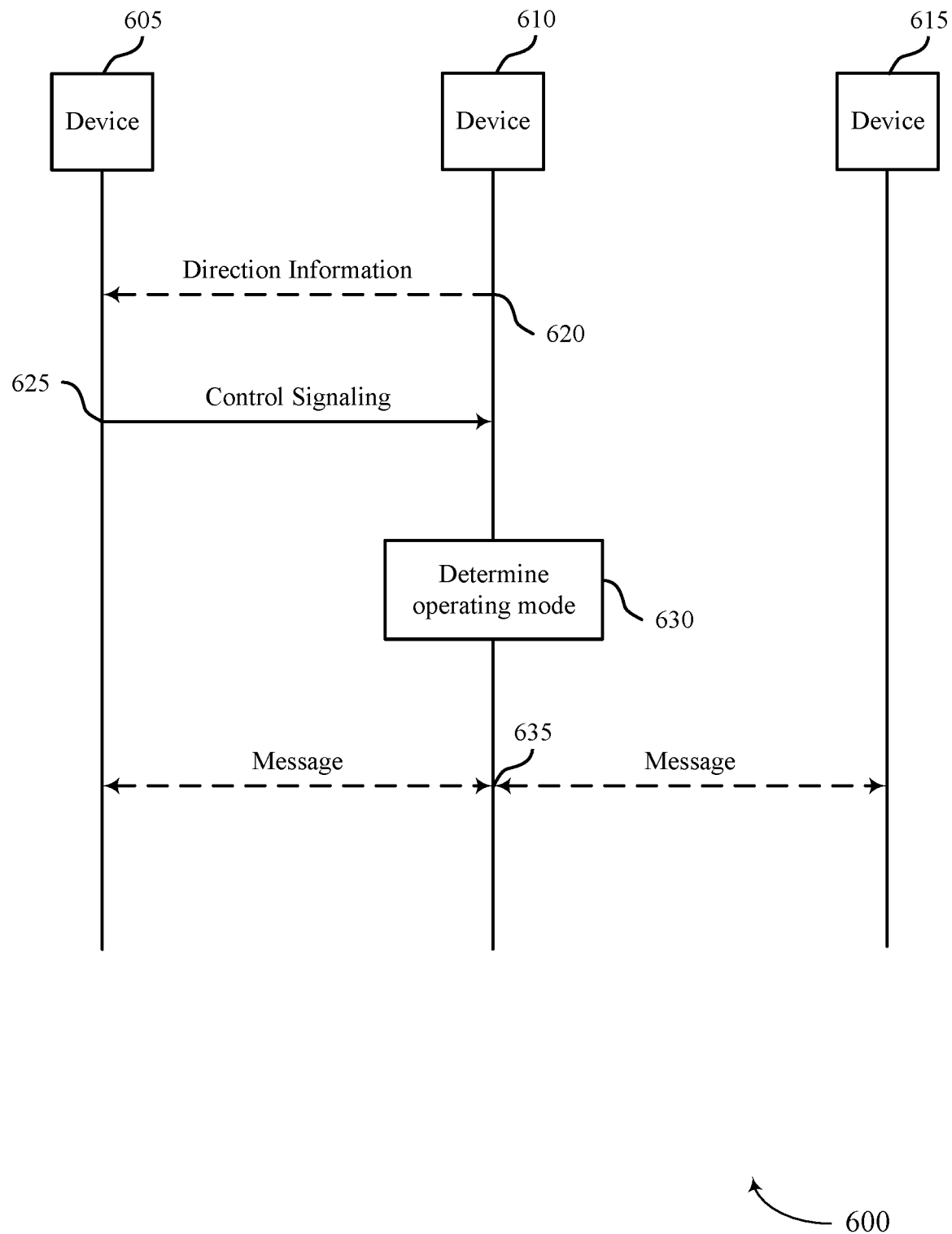

FIG. 6 illustrates an example of a process flow 600 that supports techniques for communications on grating lobes in accordance with aspects of the present disclosure. In some examples, the process flow 600 may implement aspects of a wireless communications system 100 through 300-b as described with reference to FIGS. 1 through 3B. The process flow 600 may be implemented by a device 605, a device 610, and a device 615 to support simultaneous communication of messages using one or more grating lobes of a directional beam (e.g., in mmW systems). The process flow 600 may further be implemented by the devices 605, 610, and 615 to reduce latency, increase coverage, and increase coordination between the devices 605, 610, and 615, among other benefits.

The devices 605, 610, and 615 may be examples of a base station 105 or a UE 115, as described with reference to FIGS. 1 through 3B. In the following description of the process flow 600, the operations between the devices 605, 610, and 615 may be communicated in a different order than the example order shown, or the operations performed by the devices 605, 610, and 615 may be performed in different orders or at different times. Some operations may also be omitted from the process flow 600, and other operations may be added to the process flow 600.

At 620, the device 610 may optionally transmit, to the device 605, direction information that indicates respective directions of a main lobe of a directional beam and a grating lobe of the directional beam, where the directional beam is used by the device 610 to transmit messages.

At 625, the device 605 may transmit control signaling to the device 610 that indicates whether to simultaneously communicate a message using the main lobe and the grating lobe.

At 630, the device 610 may determine an operating mode for communicating the message based on the control signaling. For example, if the control signaling indicates for the device 610 to simultaneously communicate the message, the device 610 may select an operating mode to simultaneously communicate the message. For example, the device 610 may select an operating frequency to communicate the message such that the main lobe and the grating lobe are generated. Alternatively, the control signaling may indicate for the device 610 to select an operating mode (e.g., a different operating frequency) such that the grating lobe (e.g., a signal strength of the grating lobe, a gain of the grating lobe) is reduced or eliminated. For example, the control signaling may indicate the device 610 to switch operating frequencies to the operating frequency that reduces or eliminates the grating lobe.

At 635, the device 610 may communicate the message based on the control signaling. For example, if the control signaling indicates for the device 610 to simultaneously communicate the message, the device 610 may simultaneously communicate the message with the device 605 on the main lobe and with the device 615 on the grating lobe (e.g., or vice versa). Alternatively, the device 610 may communicate the message with the device 615 on the main lobe. For example, if the control signaling indicates for the device 610 to switch operating frequencies, the device 610 may not generate a grating lobe in the direction of the device 605 or the device 615 (e.g., may generate a side lobe instead) such that the message is not communicated with the device 605 or the device 615.

Figure 7:
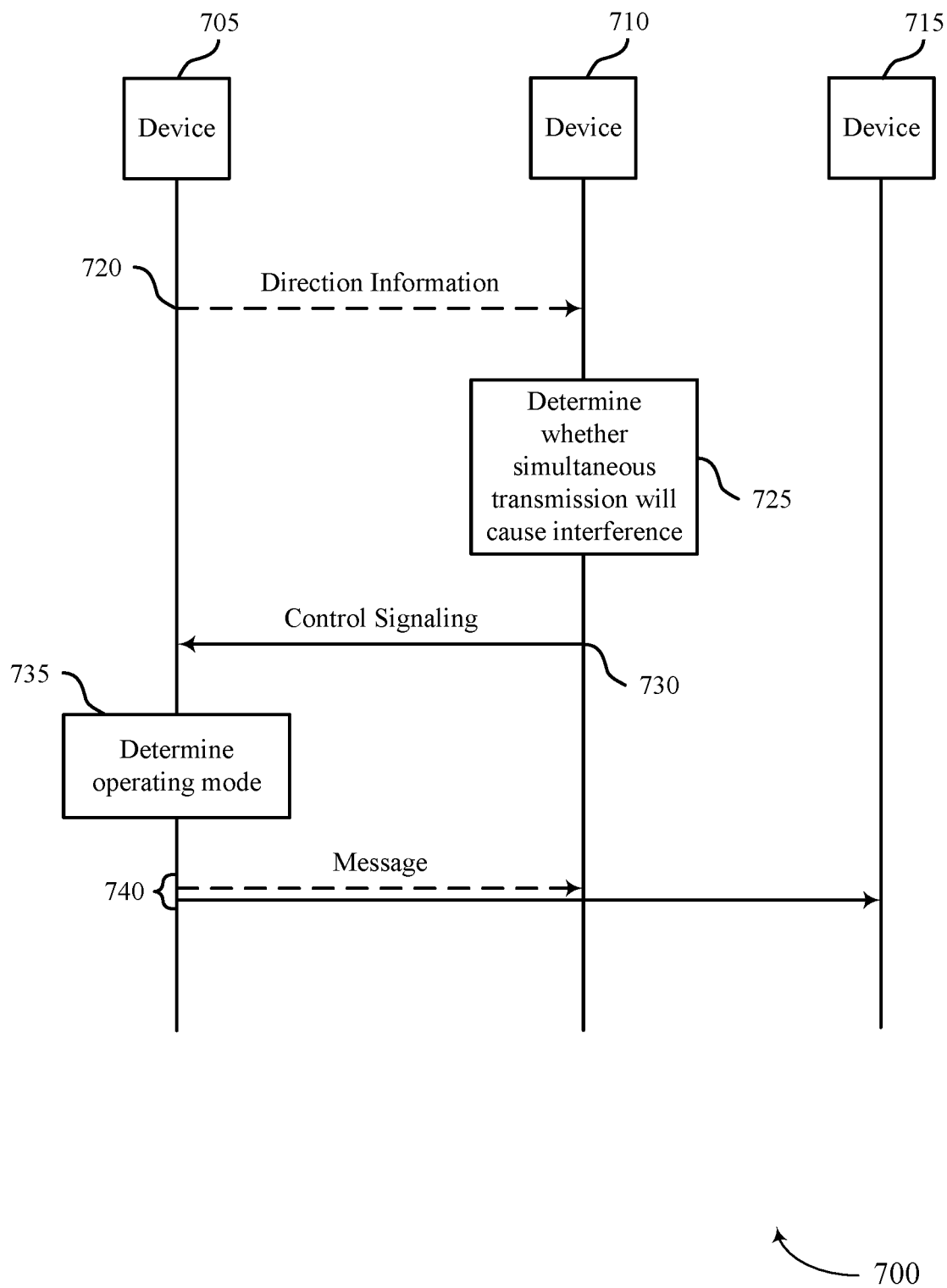

FIG. 7 illustrates an example of a process flow 700 that supports techniques for communications on grating lobes in accordance with aspects of the present disclosure. In some examples, the process flow 700 may implement aspects of a wireless communications system 100 through 300-b as described with reference to FIGS. 1 through 3B. The process flow 700 may be implemented by a device 705, a device 710, and a device 715 to support simultaneous communication of messages using one or more grating lobes of a directional beam (e.g., in mmW systems). The process flow 700 may further be implemented by the devices 705, 710, and 715 to reduce latency, increase coverage, and increase coordination between the devices 705, 710, and 715, among other benefits.

The devices 705, 710, and 715 may be examples of a base station 105 or a UE 115, as described with reference to FIGS. 1 through 3B. In the following description of the process flow 700, the operations between the devices 705, 710, and 715 may be communicated in a different order than the example order shown, or the operations performed by the devices 705, 710, and 715 may be performed in different orders or at different times. Some operations may also be omitted from the process flow 700, and other operations may be added to the process flow 700.

At 720, the device 705 may optionally transmit direction information to the device 710 that indicates respective directions of a main lobe of a directional beam and a grating lobe of the directional beam, where the directional beam is used by the device 705 to transmit messages.

At 725, the device 710 may determine whether simultaneous transmission of a message by the device 705 on the main lobe and grating lobe will cause interference at the device 710. In some examples, the device 710 may determine whether the simultaneous transmission of the message will cause interference based on the directional information, a signal strength associated with the grating lobe, an operating frequency of the device 705, an inter-antenna element spacing of an antenna array of the device 705, a quantity of antenna elements of the antenna array, an elemental gain pattern of a representative antenna of the antenna array, a peak elemental gain of the representative antenna element, a geometry of the antenna array, or a combination thereof.

At 730, the device 710 may transmit control signaling to the device 705 that indicates whether to simultaneously transmit the message based on the determination.

At 735, the device 705 may determine an operation mode based on the control signaling. For example, if the control signaling indicates for the device 705 to simultaneously transmit the message, the device 705 may select an operating mode to simultaneously transmit the message. For example, the device 705 may select an operating frequency to transmit the message such that the main lobe and the grating lobe are generated. Alternatively, the control signaling may indicate for the device 705 to select an operating mode (e.g., an operating frequency) such that the grating lobe (e.g., a signal strength of the grating lobe, a gain of the grating lobe) is reduced or eliminated. For example, the control signaling may indicate the device 705 to switch operating frequencies to the operating frequency that reduces or eliminates the grating lobe.

At 740, the device 705 may transmit the message based on the control signaling. For example, if the control signaling indicates for the device 705 to simultaneously transmit the message, the device 710 may simultaneously transmit the message to the device 710 on the main lobe and to the device 715 on the grating lobe (e.g., or vice versa). Alternatively, the device 705 may transmit the message to the device 615 on the main lobe. For example, if the control signaling indicates for the device 705 to switch operating frequencies (e.g., that the grating lobe will cause interference at the device 710), the device 705 may not generate a grating lobe in the direction of the device 710 (e.g., may generate a side lobe instead) such that the message is not transmitted to the device 710.

Figure 8:
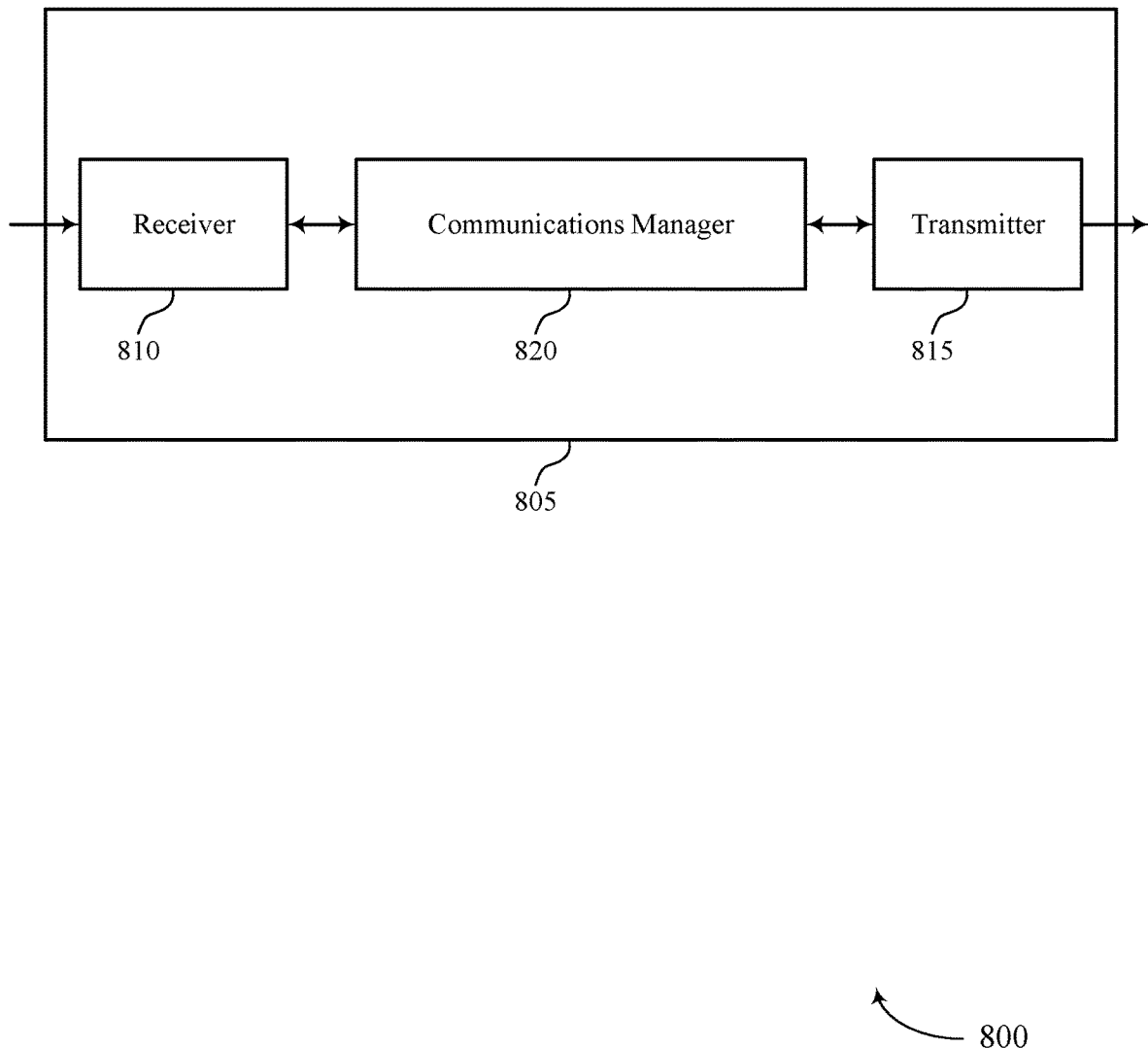
FIGS. 8 and 9 show block diagrams of devices that support techniques for communications on grating lobes in accordance with aspects of the present disclosure.

FIG. 8 shows a block diagram 800 of a device 805 that supports techniques for communications on grating lobes in accordance with aspects of the present disclosure. The device 805 may be an example of aspects of a UE 115 or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for communications on grating lobes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for communications on grating lobes). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for communications on grating lobes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first wireless device in accordance with examples as disclosed herein. For example, the communications manager 820 may be configured as or otherwise support a means for receiving, from a second wireless device, control signaling indicating that a message is to be transmitted using a first lobe of a directional beam, the first lobe of the directional beam being different from a second lobe of the directional beam that is used to simultaneously transmit the message to a third wireless device. The communications manager 820 may be configured as or otherwise support a means for determining a set of beamforming parameters for receiving the message from the second wireless device based on the control signaling indicating that the message is to be transmitted using the first lobe of the directional beam. The communications manager 820 may be configured as or otherwise support a means for receiving the message on the first lobe of the directional beam based on the set of beamforming parameters.

Additionally or alternatively, the communications manager 820 may support wireless communication at a first wireless device in a wireless communication system in accordance with examples as disclosed herein. For example, the communications manager 820 may be configured as or otherwise support a means for receiving, from a second wireless device, control signaling indicating that a message is to be simultaneously transmitted from the second wireless device and from a third wireless device to the first wireless device. The communications manager 820 may be configured as or otherwise support a means for determining a set of beamforming parameters for simultaneously receiving the message based on the control signaling indicating that the message is to be simultaneously transmitted. The communications manager 820 may be configured as or otherwise support a means for simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe.

Additionally or alternatively, the communications manager 820 may support wireless communication at a first wireless device in accordance with examples as disclosed herein. For example, the communications manager 820 may be configured as or otherwise support a means for receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device. The communications manager 820 may be configured as or otherwise support a means for determining an operating mode for communicating the message based on the control signaling indicating whether to simultaneously communicate the message. The communications manager 820 may be configured as or otherwise support a means for communicating the message according to the determined operating mode.

Additionally or alternatively, the communications manager 820 may support wireless communication at a first wireless device in accordance with examples as disclosed herein. For example, the communications manager 820 may be configured as or otherwise support a means for determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device. The communications manager 820 may be configured as or otherwise support a means for transmitting, to the second wireless device, control signaling indicating whether to simultaneously transmit the message based on the determination.

By including or configuring the communications manager 820 in accordance with examples as described herein, the device 805 (e.g., a processor controlling or otherwise coupled to the receiver 810, the transmitter 815, the communications manager 820, or a combination thereof) may increase the efficient utilization of communication resources. For example, by simultaneously communicating messages on multiple lobes of a directional beam, the device 805 may increase a quantity of messages that may be communicated over a single directional beam.

Figure 9:
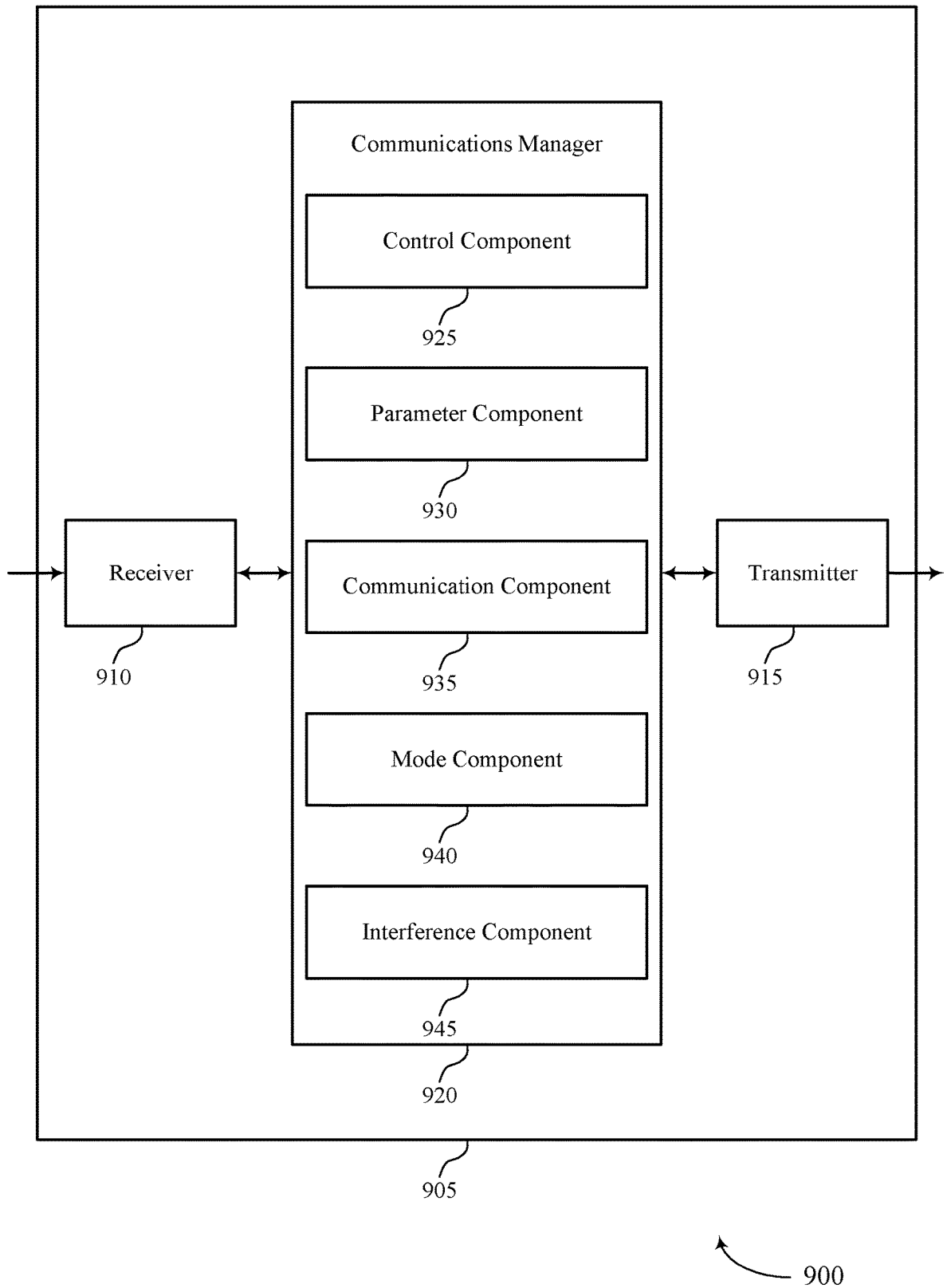

FIG. 9 shows a block diagram 900 of a device 905 that supports techniques for communications on grating lobes in accordance with aspects of the present disclosure. The device 905 may be an example of aspects of a device 805, a UE 115, or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for communications on grating lobes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for communications on grating lobes). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for communications on grating lobes as described herein. For example, the communications manager 920 may include a control component 925, a parameter component 930, a communication component 935, a mode component 940, an interference component 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first wireless device in accordance with examples as disclosed herein. The control component 925 may be configured as or otherwise support a means for receiving, from a second wireless device, control signaling indicating that a message is to be transmitted using a first lobe of a directional beam, the first lobe of the directional beam being different from a second lobe of the directional beam that is used to simultaneously transmit the message to a third wireless device. The parameter component 930 may be configured as or otherwise support a means for determining a set of beamforming parameters for receiving the message from the second wireless device based on the control signaling indicating that the message is to be transmitted using the first lobe of the directional beam. The communication component 935 may be configured as or otherwise support a means for receiving the message on the first lobe of the directional beam based on the set of beamforming parameters.

Additionally or alternatively, the communications manager 920 may support wireless communication at a first wireless device in a wireless communication system in accordance with examples as disclosed herein. The control component 925 may be configured as or otherwise support a means for receiving, from a second wireless device, control signaling indicating that a message is to be simultaneously transmitted from the second wireless device and from a third wireless device to the first wireless device. The parameter component 930 may be configured as or otherwise support a means for determining a set of beamforming parameters for simultaneously receiving the message based on the control signaling indicating that the message is to be simultaneously transmitted. The communication component 935 may be configured as or otherwise support a means for simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe.

Additionally or alternatively, the communications manager 920 may support wireless communication at a first wireless device in accordance with examples as disclosed herein. The control component 925 may be configured as or otherwise support a means for receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device. The mode component 940 may be configured as or otherwise support a means for determining an operating mode for communicating the message based on the control signaling indicating whether to simultaneously communicate the message. The communication component 935 may be configured as or otherwise support a means for communicating the message according to the determined operating mode.

Additionally or alternatively, the communications manager 920 may support wireless communication at a first wireless device in accordance with examples as disclosed herein. The interference component 945 may be configured as or otherwise support a means for determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device. The control component 925 may be configured as or otherwise support a means for transmitting, to the second wireless device, control signaling indicating whether to simultaneously transmit the message based on the determination.

Figure 10:
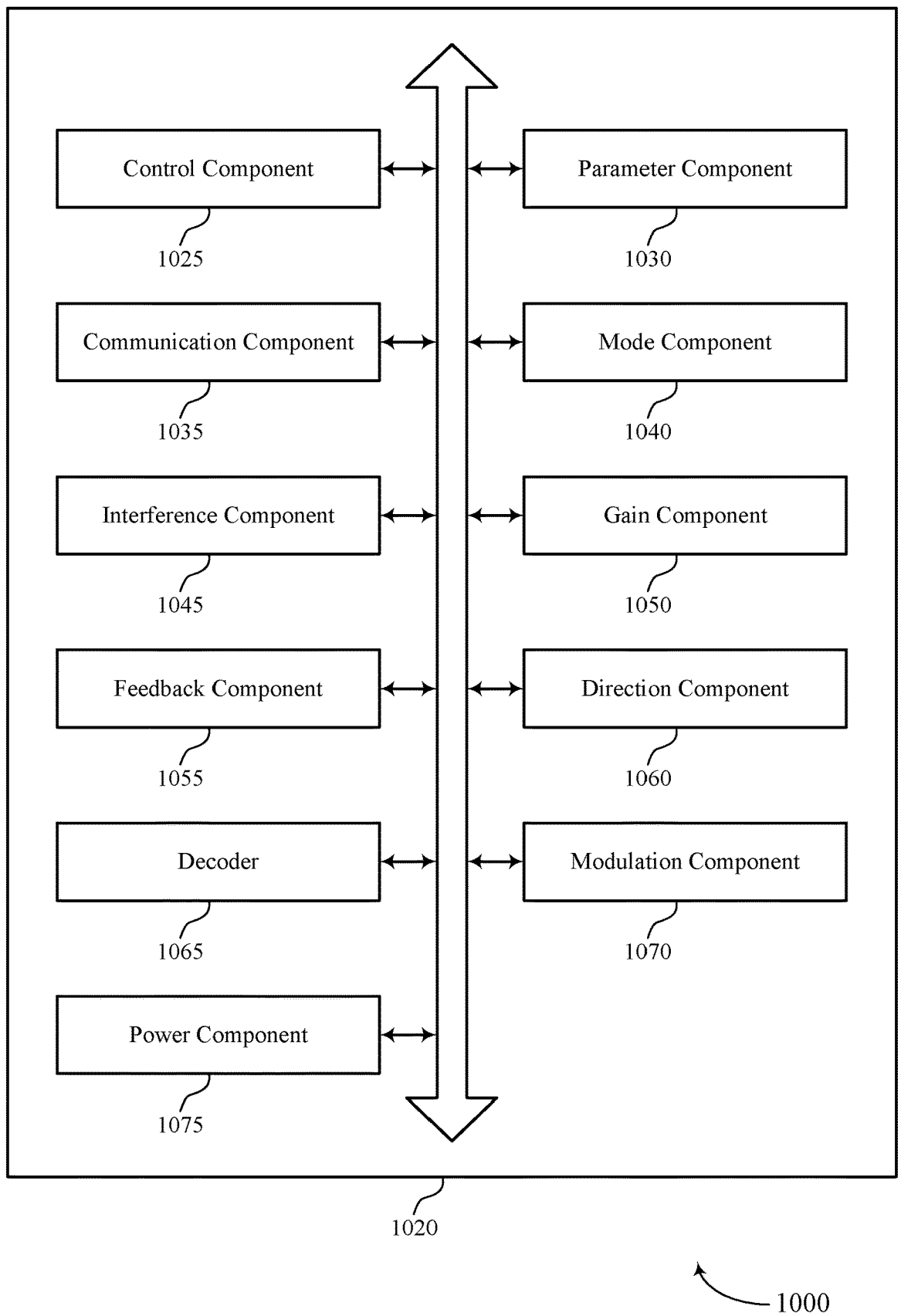
FIG. 10 shows a block diagram of a communications manager that supports techniques for communications on grating lobes in accordance with aspects of the present disclosure.

FIG. 10 shows a block diagram 1000 of a communications manager 1020 that supports techniques for communications on grating lobes in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for communications on grating lobes as described herein. For example, the communications manager 1020 may include a control component 1025, a parameter component 1030, a communication component 1035, a mode component 1040, an interference component 1045, a gain component 1050, a feedback component 1055, a direction component 1060, a decoder 1065, a modulation component 1070, a power component 1075, or any combination thereof. Each of these components may communicate, directly or indirectly, with one another (e.g., via one or more buses).

The communications manager 1020 may support wireless communication at a first wireless device in accordance with examples as disclosed herein. The control component 1025 may be configured as or otherwise support a means for receiving, from a second wireless device, control signaling indicating that a message is to be transmitted using a first lobe of a directional beam, the first lobe of the directional beam being different from a second lobe of the directional beam that is used to simultaneously transmit the message to a third wireless device. The parameter component 1030 may be configured as or otherwise support a means for determining a set of beamforming parameters for receiving the message from the second wireless device based on the control signaling indicating that the message is to be transmitted using the first lobe of the directional beam. The communication component 1035 may be configured as or otherwise support a means for receiving the message on the first lobe of the directional beam based on the set of beamforming parameters.

In some examples, the gain component 1050 may be configured as or otherwise support a means for receiving, from the second wireless device, a second message indicating a difference between a first gain associated with the first lobe of the directional beam and a second gain associated with the second lobe of the directional beam.

In some examples, the decoder 1065 may be configured as or otherwise support a means for decoding the message received on the first lobe of the directional beam based on the difference between the first gain and the second gain.

In some examples, the modulation component 1070 may be configured as or otherwise support a means for transmitting, to the second wireless device, a third message indicating an MCS for transmitting the message based on the difference between the first gain and the second gain.

In some examples, the feedback component 1055 may be configured as or otherwise support a means for transmitting, to the second wireless device, feedback associated with communicating with the second wireless device on a second directional beam different from the directional beam, where the control signaling indicating that the message is to be transmitted using the first lobe of the directional beam is based on the feedback.

In some examples, the feedback includes a TCI state, one or more SSB indices, an indication of whether a signal strength associated with the second directional beam satisfies a signal strength threshold, or a combination thereof.

In some examples, to support transmitting the feedback to the second wireless device, the feedback component 1055 may be configured as or otherwise support a means for transmitting the feedback on the second directional beam.

In some examples, to support receiving the control signaling from the second wireless device, the control component 1025 may be configured as or otherwise support a means for receiving the control signaling on a second directional beam different from the directional beam.

In some examples, the control signaling further includes a QCL indication associated with the directional beam. In some examples, determining the set of beamforming parameters is based on the QCL indication.

In some examples, the first lobe of the directional beam is a grating lobe from a set of lobes corresponding to the directional beam and the second lobe of the directional beam is a main lobe of the directional beam.

In some examples, the control component 1025 may be configured as or otherwise support a means for transmitting, to the second wireless device, second control signaling indicating that a second message is to be transmitted using a first lobe of a second directional beam. In some examples, the parameter component 1030 may be configured as or otherwise support a means for determining a second set of beamforming parameters for simultaneously transmitting the second message to the second wireless device and a fourth wireless device based on indicating that the second message is to be transmitted using the first lobe of the second directional beam. In some examples, the communication component 1035 may be configured as or otherwise support a means for simultaneously transmitting the second message to the second wireless device and the fourth wireless device, where the second message is transmitted to the second wireless device using the first lobe of the second directional beam and transmitted to the fourth wireless device using a second lobe of the second directional beam different from the first lobe of the second directional beam.

In some examples, the gain component 1050 may be configured as or otherwise support a means for transmitting, to the second wireless device, or the fourth wireless device, or both, a third message indicating a difference between a first gain associated with the first lobe of the second directional beam and a second gain associated with the second lobe of the second directional beam.

In some examples, the modulation component 1070 may be configured as or otherwise support a means for receiving, from the second wireless device, or the third wireless device, or both, a fourth message indicating an MCS for transmitting the second message based on the difference between the first gain and the second gain, where simultaneously transmitting the second message includes simultaneously transmitting the second message according to the indicated MCS.

In some examples, the gain component 1050 may be configured as or otherwise support a means for determining a difference between a first gain associated with the first lobe of the second directional beam and a second gain associated with the second lobe of the second directional beam. In some examples, the power component 1075 may be configured as or otherwise support a means for adjusting a transmit power associated with simultaneously transmitting the second message to compensate for the difference between the first gain and the second gain.

In some examples, the set of beamforming parameters includes a set of beamforming weights used to generate the first lobe of the second directional beam and the second lobe of the second directional beam.

In some examples, the first lobe of the second directional beam is a grating lobe of the second directional beam and the second lobe of the second directional beam is a main lobe of the second directional beam.

Additionally or alternatively, the communications manager 1020 may support wireless communication at a first wireless device in a wireless communication system in accordance with examples as disclosed herein. In some examples, the control component 1025 may be configured as or otherwise support a means for receiving, from a second wireless device, control signaling indicating that a message is to be simultaneously transmitted from the second wireless device and from a third wireless device to the first wireless device. In some examples, the parameter component 1030 may be configured as or otherwise support a means for determining a set of beamforming parameters for simultaneously receiving the message based on the control signaling indicating that the message is to be simultaneously transmitted. In some examples, the communication component 1035 may be configured as or otherwise support a means for simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe.

In some examples, the gain component 1050 may be configured as or otherwise support a means for transmitting, to the second wireless device, or the third wireless device, or both, a second message indicating a difference between a first gain associated with the first lobe of the directional beam and a second gain associated with the second lobe of the directional beam, where simultaneously receiving the message is based on the difference between the first gain and the second gain.

In some examples, the set of beamforming parameters includes a set of beamforming weights used to generate the first lobe of the directional beam and the second lobe of the directional beam.

In some examples, the wireless communication system includes an SFN. In some examples, the second wireless device and the third wireless device each include a TRP in the SFN.

Additionally or alternatively, the communications manager 1020 may support wireless communication at a first wireless device in accordance with examples as disclosed herein. In some examples, the control component 1025 may be configured as or otherwise support a means for receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device. The mode component 1040 may be configured as or otherwise support a means for determining an operating mode for communicating the message based on the control signaling indicating whether to simultaneously communicate the message. In some examples, the communication component 1035 may be configured as or otherwise support a means for communicating the message according to the determined operating mode.

In some examples, the direction component 1060 may be configured as or otherwise support a means for transmitting a second message indicating a first direction of the first lobe and a second direction of the second lobe, the second direction different from the first direction, where the control signaling indicating whether to simultaneously communicate the message is based on the first direction and the second direction.

In some examples, the control signaling indicating whether to simultaneously communicate the message is based on whether a first signal strength associated with communicating using the first lobe satisfies a first signal strength threshold and whether a second signal strength associated with communicating using the second lobe satisfies a second signal strength threshold.

In some examples, to support determining the operating mode, the mode component 1040 may be configured as or otherwise support a means for selecting the operating mode to simultaneously communicate the message using the first lobe and the second lobe based on the control signaling indicating to simultaneously communicate the message.

In some examples, to support determining the operating mode, the mode component 1040 may be configured as or otherwise support a means for selecting the operating mode to communicate the message to the second wireless device or the third wireless device using a first lobe of a second directional beam different from the directional beam based on the control signaling indicating not to simultaneously communicate the message.

In some examples, the control signaling indicating whether to simultaneously communicate the message is based on an operating frequency of the first wireless device, an inter-antenna element spacing of an antenna array of the first wireless device, a quantity of antenna elements of the antenna array, an elemental gain pattern of a representative antenna element of the antenna array, a peak elemental gain of the representative antenna element, a geometry of the antenna array, or a combination thereof.

In some examples, the control signaling includes L1 signaling, L2 signaling, RRC signaling, or a combination thereof.

Additionally or alternatively, the communications manager 1020 may support wireless communication at a first wireless device in accordance with examples as disclosed herein. The interference component 1045 may be configured as or otherwise support a means for determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device. In some examples, the control component 1025 may be configured as or otherwise support a means for transmitting, to the second wireless device, control signaling indicating whether to simultaneously transmit the message based on the determination.

In some examples, the control signaling indicates the second wireless device is to switch operating frequencies based on determining that the simultaneous transmission of the message will cause interference at the first wireless device.

In some examples, to support determining whether the simultaneous transmission of the message will cause interference, the interference component 1045 may be configured as or otherwise support a means for determining whether the simultaneous transmission of the message will cause interference based on a second indication of a first direction of the first lobe of the directional beam, a signal strength associated with the first lobe of the directional beam, an operating frequency of the second wireless device, an inter-antenna element spacing of an antenna array of the second wireless device, a quantity of antenna elements of the antenna array, an elemental gain pattern of a representative antenna element of the antenna array, a peak elemental gain of the representative antenna element, a geometry of the antenna array, or a combination thereof.

Figure 11:
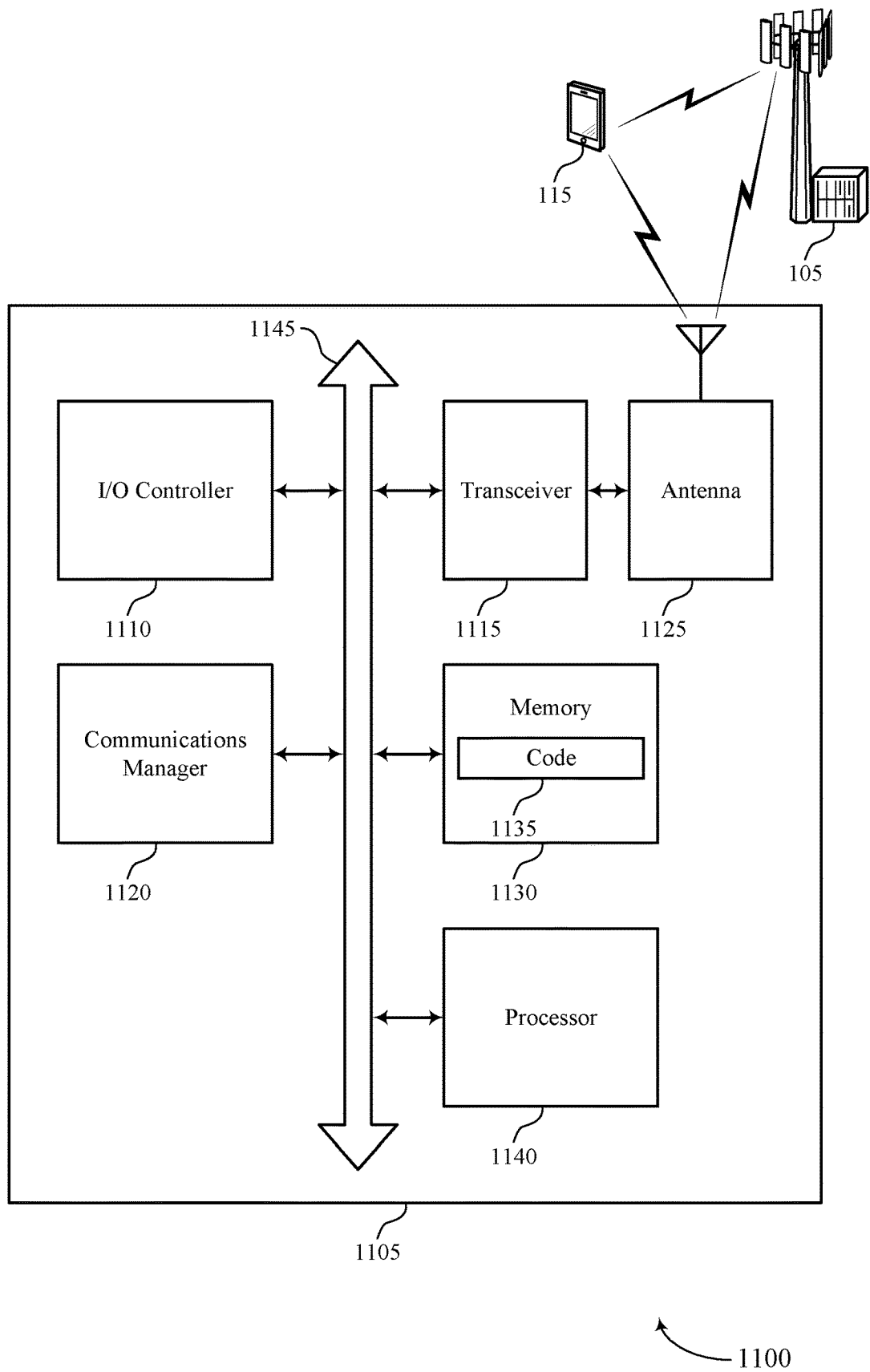
FIG. 11 shows a diagram of a system including a UE that supports techniques for communications on grating lobes in accordance with aspects of the present disclosure.

FIG. 11 shows a diagram of a system 1100 including a device 1105 that supports techniques for communications on grating lobes in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for communications on grating lobes). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first wireless device in accordance with examples as disclosed herein. For example, the communications manager 1120 may be configured as or otherwise support a means for receiving, from a second wireless device, control signaling indicating that a message is to be transmitted using a first lobe of a directional beam, the first lobe of the directional beam being different from a second lobe of the directional beam that is used to simultaneously transmit the message to a third wireless device. The communications manager 1120 may be configured as or otherwise support a means for determining a set of beamforming parameters for receiving the message from the second wireless device based on the control signaling indicating that the message is to be transmitted using the first lobe of the directional beam. The communications manager 1120 may be configured as or otherwise support a means for receiving the message on the first lobe of the directional beam based on the set of beamforming parameters.

Additionally or alternatively, the communications manager 1120 may support wireless communication at a first wireless device in a wireless communication system in accordance with examples as disclosed herein. For example, the communications manager 1120 may be configured as or otherwise support a means for receiving, from a second wireless device, control signaling indicating that a message is to be simultaneously transmitted from the second wireless device and from a third wireless device to the first wireless device. The communications manager 1120 may be configured as or otherwise support a means for determining a set of beamforming parameters for simultaneously receiving the message based on the control signaling indicating that the message is to be simultaneously transmitted. The communications manager 1120 may be configured as or otherwise support a means for simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe.

Additionally or alternatively, the communications manager 1120 may support wireless communication at a first wireless device in accordance with examples as disclosed herein. For example, the communications manager 1120 may be configured as or otherwise support a means for receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device. The communications manager 1120 may be configured as or otherwise support a means for determining an operating mode for communicating the message based on the control signaling indicating whether to simultaneously communicate the message. The communications manager 1120 may be configured as or otherwise support a means for communicating the message according to the determined operating mode.

Additionally or alternatively, the communications manager 1120 may support wireless communication at a first wireless device in accordance with examples as disclosed herein. For example, the communications manager 1120 may be configured as or otherwise support a means for determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device. The communications manager 1120 may be configured as or otherwise support a means for transmitting, to the second wireless device, control signaling indicating whether to simultaneously transmit the message based on the determination.

By including or configuring the communications manager 1120 in accordance with examples as described herein, the device 1105 may reduce latency and increase coverage of mmW communications (e.g., over ultrawide bandwidths). For example, simultaneously communicating a message on multiple lobes of a directional beam may reduce latency and increase coverage associated with communicating the message, for example, compared to communicating the message at different times or on different beams. Additionally, communicating control signaling to coordinate simultaneous communication of messages using grating lobes may promote improvements to efficiency and resource usage mmW communications and, in some examples, may promote spectral efficiency, reduce power consumption, and improve coordination between wireless devices, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for communications on grating lobes as described herein, or the processor 1140 and the memory 1130 may be otherwise configured to perform or support such operations.

Figure 12:
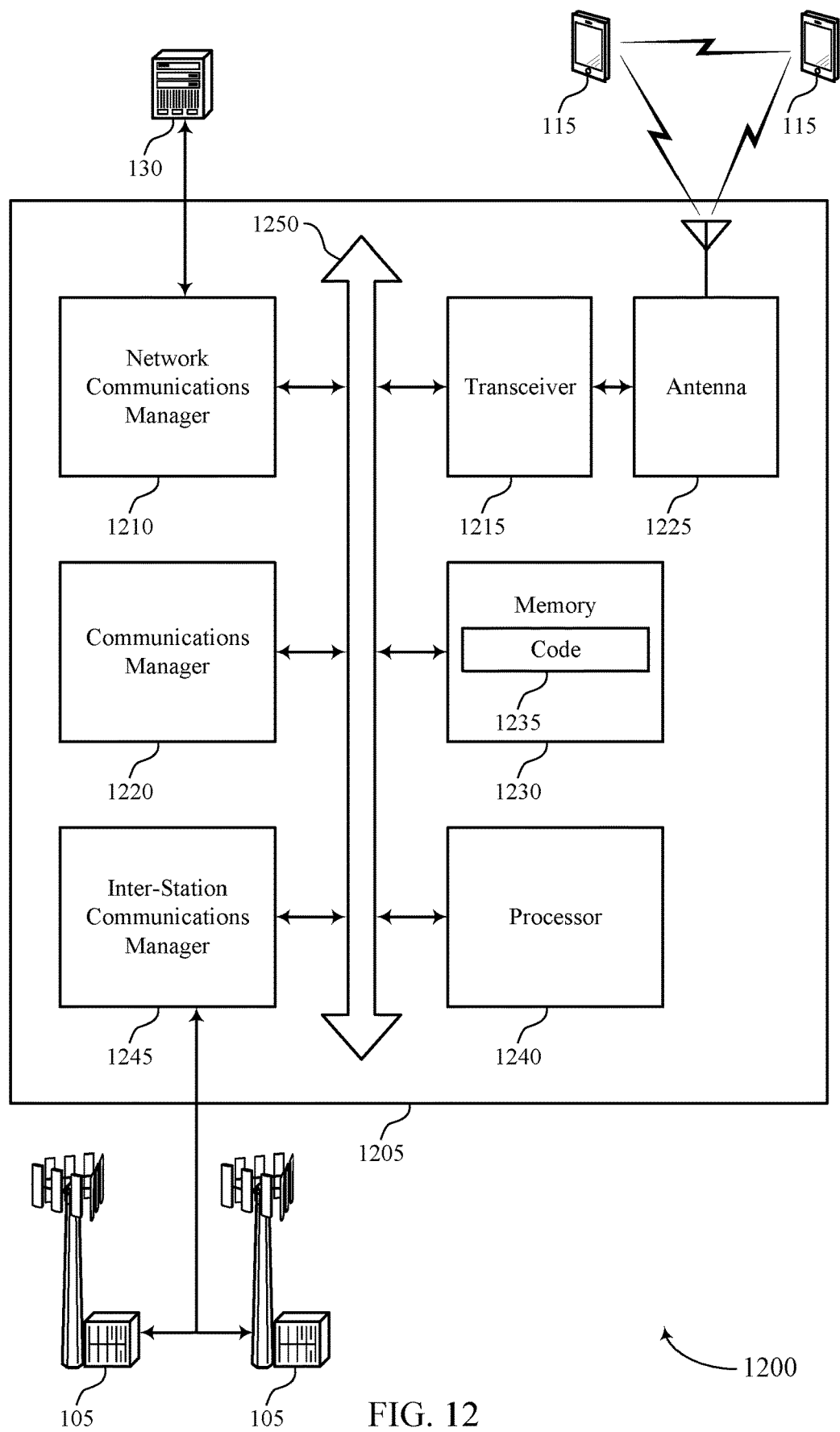
FIG. 12 shows a diagram of a system including a base station that supports techniques for communications on grating lobes in accordance with aspects of the present disclosure.

FIG. 12 shows a diagram of a system 1200 including a device 1205 that supports techniques for communications on grating lobes in accordance with aspects of the present disclosure. The device 1205 may be an example of or include the components of a device 805, a device 905, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 815, a transmitter 915, a receiver 810, a receiver 910, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for communications on grating lobes). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a first wireless device in accordance with examples as disclosed herein. For example, the communications manager 1220 may be configured as or otherwise support a means for receiving, from a second wireless device, control signaling indicating that a message is to be transmitted using a first lobe of a directional beam, the first lobe of the directional beam being different from a second lobe of the directional beam that is used to simultaneously transmit the message to a third wireless device. The communications manager 1220 may be configured as or otherwise support a means for determining a set of beamforming parameters for receiving the message from the second wireless device based on the control signaling indicating that the message is to be transmitted using the first lobe of the directional beam. The communications manager 1220 may be configured as or otherwise support a means for receiving the message on the first lobe of the directional beam based on the set of beamforming parameters.

Additionally or alternatively, the communications manager 1220 may support wireless communication at a first wireless device in a wireless communication system in accordance with examples as disclosed herein. For example, the communications manager 1220 may be configured as or otherwise support a means for receiving, from a second wireless device, control signaling indicating that a message is to be simultaneously transmitted from the second wireless device and from a third wireless device to the first wireless device. The communications manager 1220 may be configured as or otherwise support a means for determining a set of beamforming parameters for simultaneously receiving the message based on the control signaling indicating that the message is to be simultaneously transmitted. The communications manager 1220 may be configured as or otherwise support a means for simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe.

Additionally or alternatively, the communications manager 1220 may support wireless communication at a first wireless device in accordance with examples as disclosed herein. For example, the communications manager 1220 may be configured as or otherwise support a means for receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device. The communications manager 1220 may be configured as or otherwise support a means for determining an operating mode for communicating the message based on the control signaling indicating whether to simultaneously communicate the message. The communications manager 1220 may be configured as or otherwise support a means for communicating the message according to the determined operating mode.

Additionally or alternatively, the communications manager 1220 may support wireless communication at a first wireless device in accordance with examples as disclosed herein. For example, the communications manager 1220 may be configured as or otherwise support a means for determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device. The communications manager 1220 may be configured as or otherwise support a means for transmitting, to the second wireless device, control signaling indicating whether to simultaneously transmit the message based on the determination.

By including or configuring the communications manager 1220 in accordance with examples as described herein, the device 1205 may reduce latency and increase coverage of mmW communications (e.g., over ultrawide bandwidths). For example, simultaneously communicating a message on multiple lobes of a directional beam may reduce latency and increase coverage associated with communicating the message, for example, compared to communicating the message at different times or on different beams. Additionally, communicating control signaling to coordinate simultaneous communication of messages using grating lobes may promote improvements to efficiency and resource usage mmW communications and, in some examples, may promote spectral efficiency, reduce power consumption, and improve coordination between wireless devices, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for communications on grating lobes as described herein, or the processor 1240 and the memory 1230 may be otherwise configured to perform or support such operations.

Figure 13:
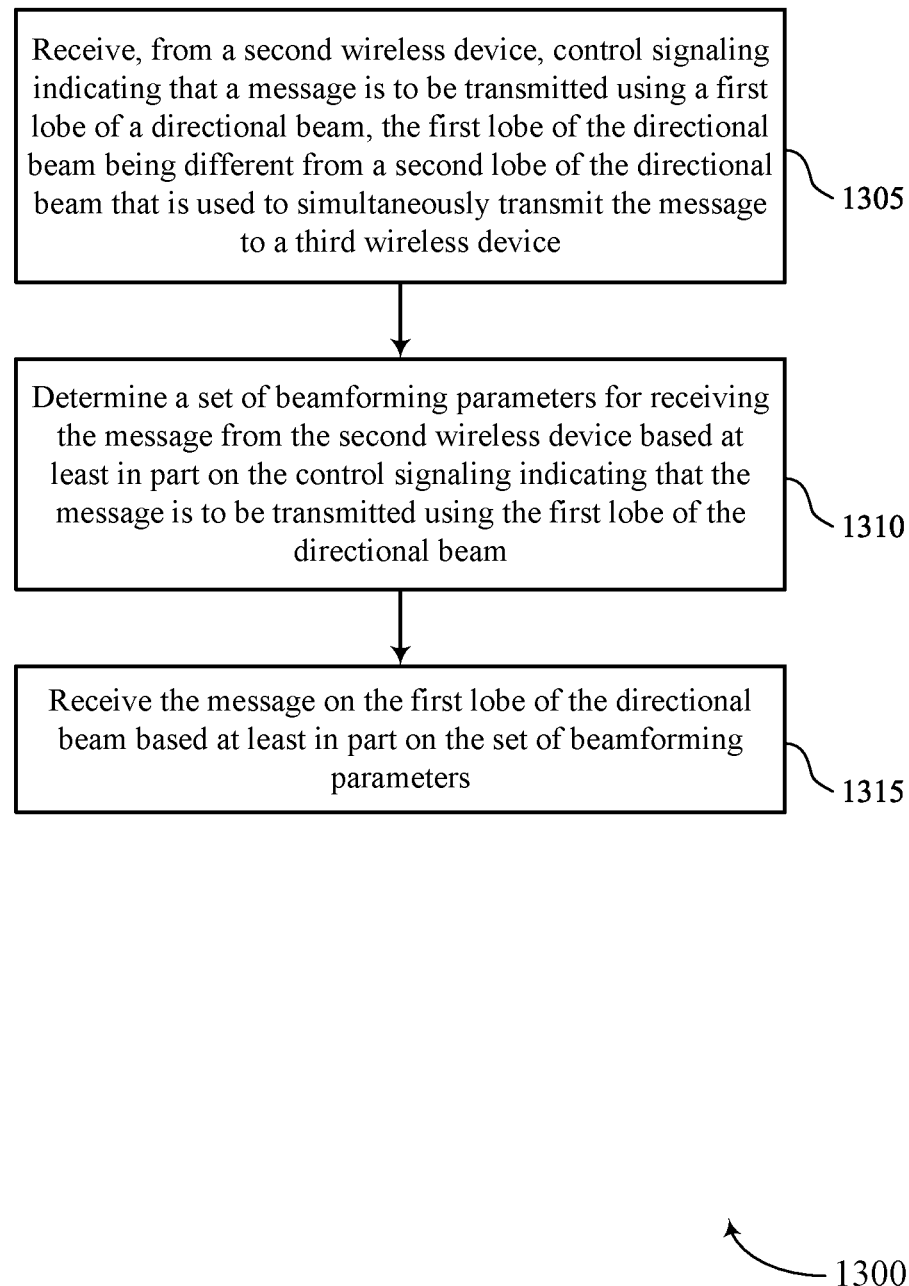
FIGS. 13 through 18 show flowcharts illustrating methods that support techniques for communications on grating lobes in accordance with aspects of the present disclosure.

FIG. 13 shows a flowchart illustrating a method 1300 that supports techniques for communications on grating lobes in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include receiving, from a second wireless device, control signaling indicating that a message is to be transmitted using a first lobe of a directional beam, the first lobe of the directional beam being different from a second lobe of the directional beam that is used to simultaneously transmit the message to a third wireless device. The operations of 1305 may be performed in accordance with examples as disclosed herein. In some examples, aspects of the operations of 1305 may be performed by a control component 1025 as described with reference to FIG. 10.

At 1310, the method may include determining a set of beamforming parameters for receiving the message from the second wireless device based on the control signaling indicating that the message is to be transmitted using the first lobe of the directional beam. The operations of 1310 may be performed in accordance with examples as disclosed herein. In some examples, aspects of the operations of 1310 may be performed by a parameter component 1030 as described with reference to FIG. 10.

At 1315, the method may include receiving the message on the first lobe of the directional beam based on the set of beamforming parameters. The operations of 1315 may be performed in accordance with examples as disclosed herein. In some examples, aspects of the operations of 1315 may be performed by a communication component 1035 as described with reference to FIG. 10.

Figure 14:
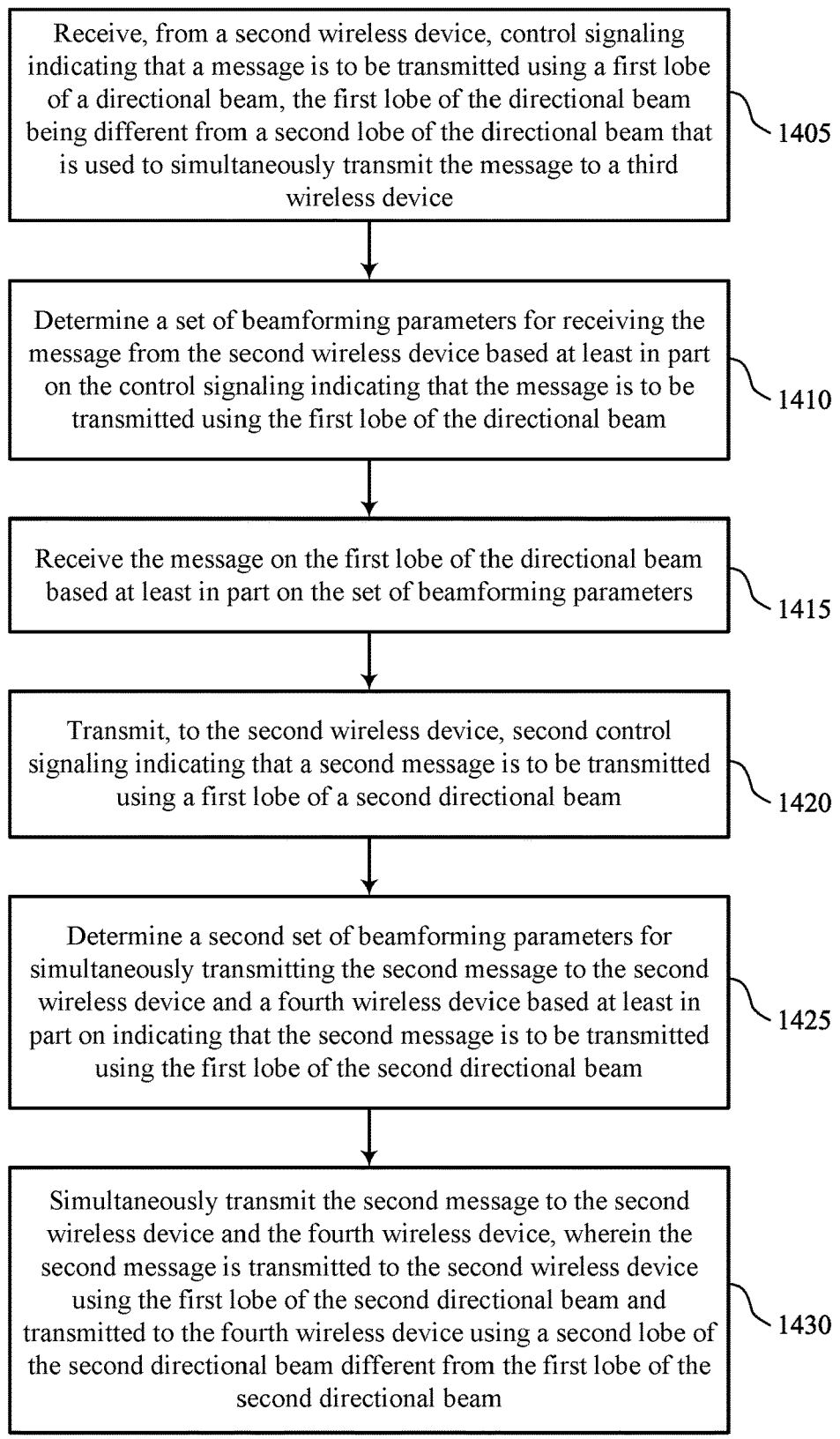

FIG. 14 shows a flowchart illustrating a method 1400 that supports techniques for communications on grating lobes in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include receiving, from a second wireless device, control signaling indicating that a message is to be transmitted using a first lobe of a directional beam, the first lobe of the directional beam being different from a second lobe of the directional beam that is used to simultaneously transmit the message to a third wireless device. The operations of 1405 may be performed in accordance with examples as disclosed herein. In some examples, aspects of the operations of 1405 may be performed by a control component 1025 as described with reference to FIG. 10.

At 1410, the method may include determining a set of beamforming parameters for receiving the message from the second wireless device based on the control signaling indicating that the message is to be transmitted using the first lobe of the directional beam. The operations of 1410 may be performed in accordance with examples as disclosed herein. In some examples, aspects of the operations of 1410 may be performed by a parameter component 1030 as described with reference to FIG. 10.

At 1415, the method may include receiving the message on the first lobe of the directional beam based on the set of beamforming parameters. The operations of 1415 may be performed in accordance with examples as disclosed herein. In some examples, aspects of the operations of 1415 may be performed by a communication component 1035 as described with reference to FIG. 10.

At 1420, the method may include transmitting, to the second wireless device, second control signaling indicating that a second message is to be transmitted using a first lobe of a second directional beam. The operations of 1420 may be performed in accordance with examples as disclosed herein. In some examples, aspects of the operations of 1420 may be performed by a control component 1025 as described with reference to FIG. 10.

At 1425, the method may include determining a second set of beamforming parameters for simultaneously transmitting the second message to the second wireless device and a fourth wireless device based on indicating that the second message is to be transmitted using the first lobe of the second directional beam. The operations of 1425 may be performed in accordance with examples as disclosed herein. In some examples, aspects of the operations of 1425 may be performed by a parameter component 1030 as described with reference to FIG. 10.

At 1430, the method may include simultaneously transmitting the second message to the second wireless device and the fourth wireless device, where the second message is transmitted to the second wireless device using the first lobe of the second directional beam and transmitted to the fourth wireless device using a second lobe of the second directional beam different from the first lobe of the second directional beam. The operations of 1430 may be performed in accordance with examples as disclosed herein. In some examples, aspects of the operations of 1430 may be performed by a communication component 1035 as described with reference to FIG. 10.

Figure 15:
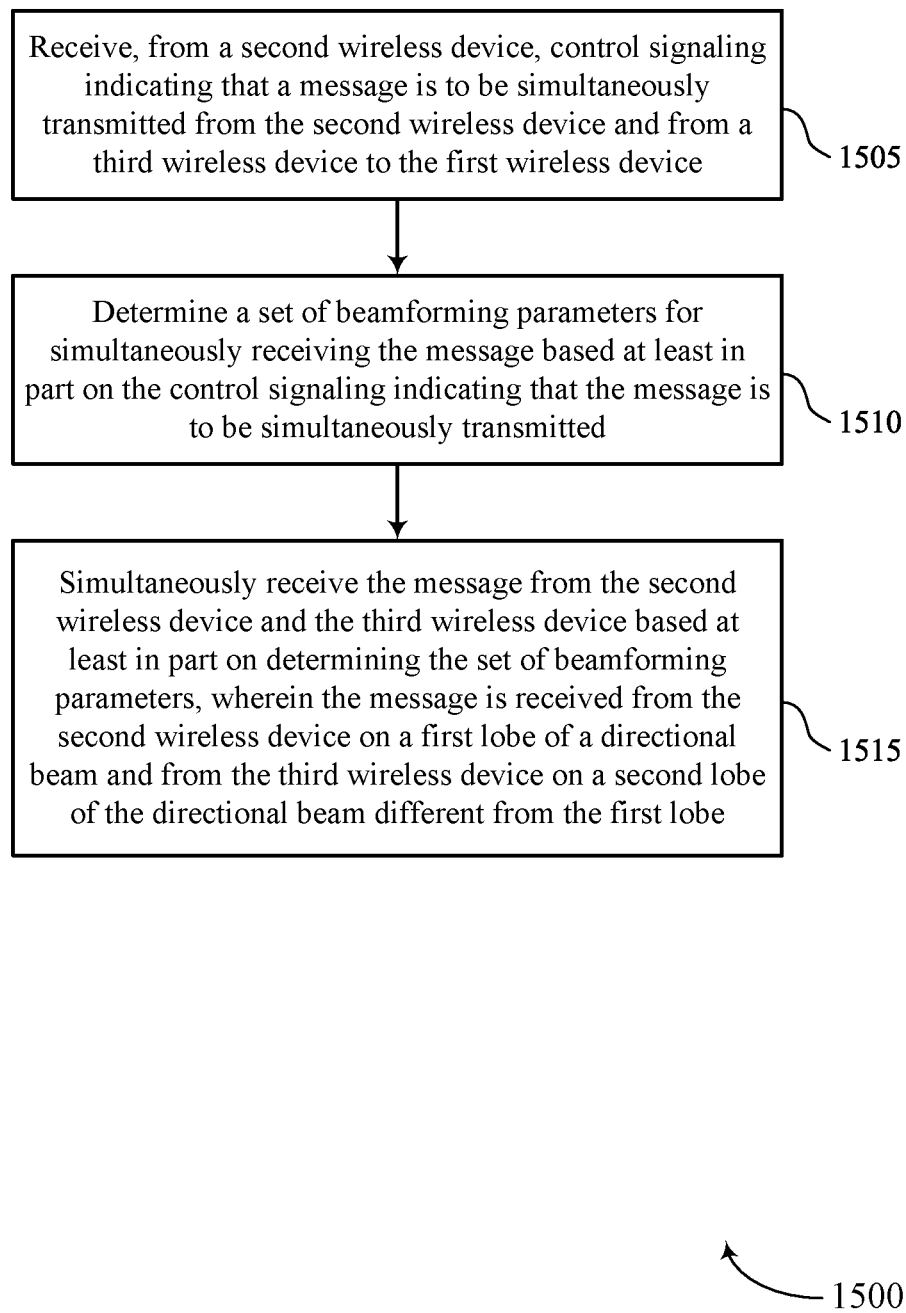

FIG. 15 shows a flowchart illustrating a method 1500 that supports techniques for communications on grating lobes in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include receiving, from a second wireless device, control signaling indicating that a message is to be simultaneously transmitted from the second wireless device and from a third wireless device to the first wireless device. The operations of 1505 may be performed in accordance with examples as disclosed herein. In some examples, aspects of the operations of 1505 may be performed by a control component 1025 as described with reference to FIG. 10.

At 1510, the method may include determining a set of beamforming parameters for simultaneously receiving the message based on the control signaling indicating that the message is to be simultaneously transmitted. The operations of 1510 may be performed in accordance with examples as disclosed herein. In some examples, aspects of the operations of 1510 may be performed by a parameter component 1030 as described with reference to FIG. 10.

At 1515, the method may include simultaneously receiving the message from the second wireless device and the third wireless device based on determining the set of beamforming parameters, where the message is received from the second wireless device on a first lobe of a directional beam and from the third wireless device on a second lobe of the directional beam different from the first lobe. The operations of 1515 may be performed in accordance with examples as disclosed herein. In some examples, aspects of the operations of 1515 may be performed by a communication component 1035 as described with reference to FIG. 10.

Figure 16:
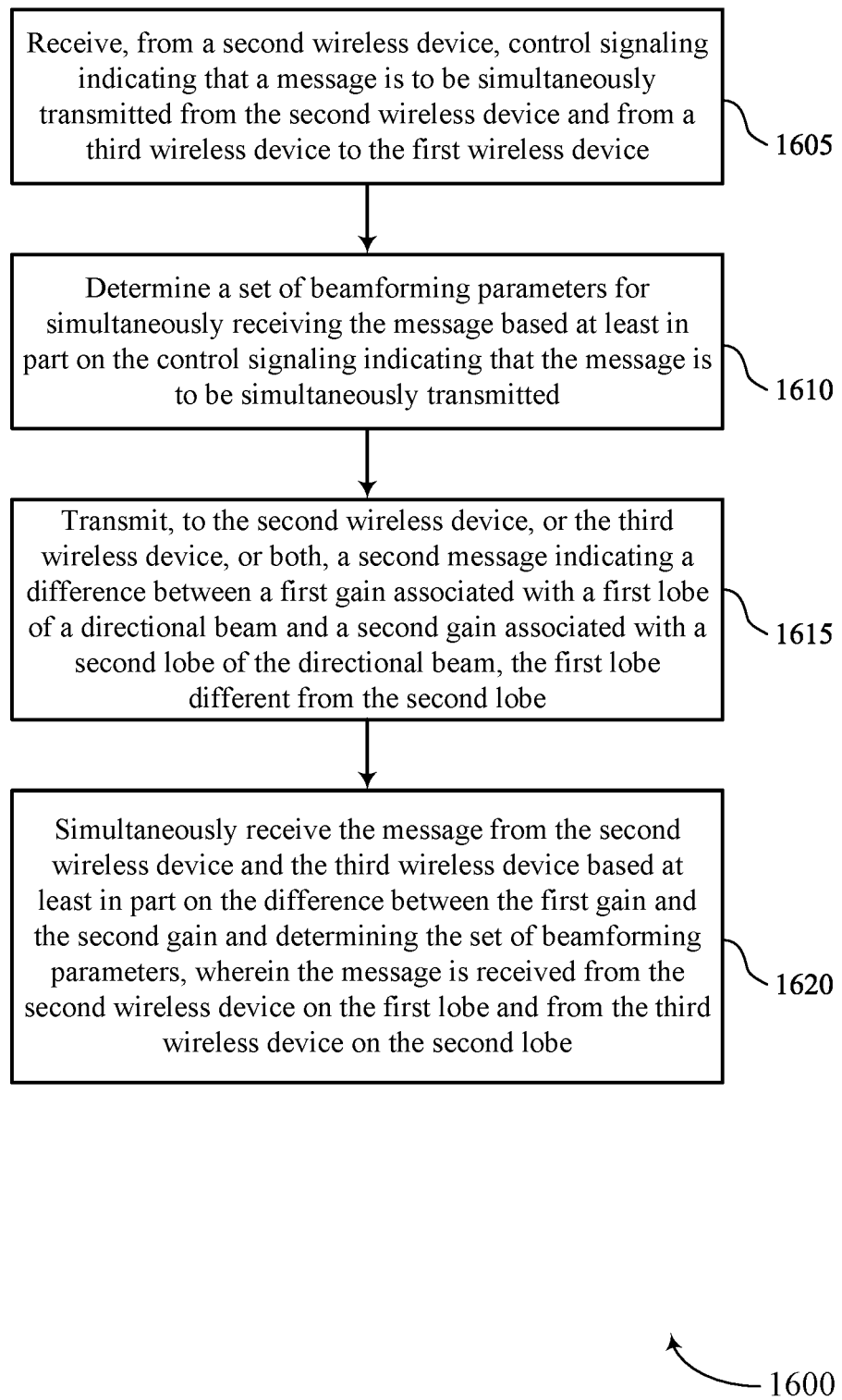

FIG. 16 shows a flowchart illustrating a method 1600 that supports techniques for communications on grating lobes in accordance with aspects of the present disclosure. The operations of the method 1600 may be implemented by a UE or a base station or its components as described herein. For example, the operations of the method 1600 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1605, the method may include receiving, from a second wireless device, control signaling indicating that a message is to be simultaneously transmitted from the second wireless device and from a third wireless device to the first wireless device. The operations of 1605 may be performed in accordance with examples as disclosed herein. In some examples, aspects of the operations of 1605 may be performed by a control component 1025 as described with reference to FIG. 10.

At 1610, the method may include determining a set of beamforming parameters for simultaneously receiving the message based on the control signaling indicating that the message is to be simultaneously transmitted. The operations of 1610 may be performed in accordance with examples as disclosed herein. In some examples, aspects of the operations of 1610 may be performed by a parameter component 1030 as described with reference to FIG. 10.

At 1615, the method may include transmitting, to the second wireless device, or the third wireless device, or both, a second message indicating a difference between a first gain associated with a first lobe of a directional beam and a second gain associated with a second lobe of the directional beam, the first lobe different from the second lobe. The operations of 1615 may be performed in accordance with examples as disclosed herein. In some examples, aspects of the operations of 1615 may be performed by a gain component 1050 as described with reference to FIG. 10.

At 1620, the method may include simultaneously receiving the message from the second wireless device and the third wireless device based on the difference between the first gain and the second gain and determining the set of beamforming parameters, where the message is received from the second wireless device on the first lobe and from the third wireless device on the second lobe. The operations of 1620 may be performed in accordance with examples as disclosed herein. In some examples, aspects of the operations of 1620 may be performed by a communication component 1035 as described with reference to FIG. 10.

Figure 17:
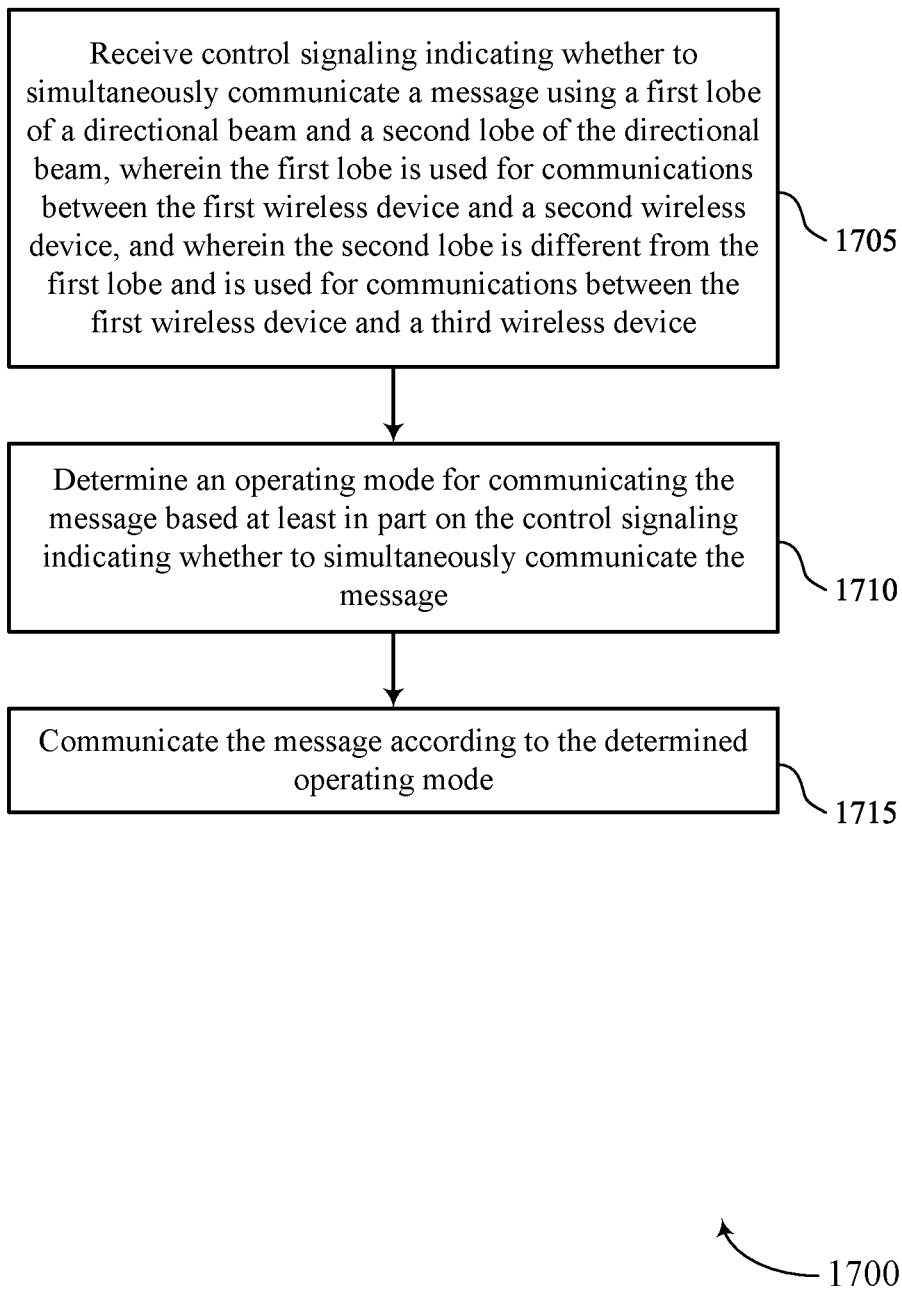

FIG. 17 shows a flowchart illustrating a method 1700 that supports techniques for communications on grating lobes in accordance with aspects of the present disclosure. The operations of the method 1700 may be implemented by a UE or a base station or its components as described herein. For example, the operations of the method 1700 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1705, the method may include receiving control signaling indicating whether to simultaneously communicate a message using a first lobe of a directional beam and a second lobe of the directional beam, where the first lobe is used for communications between the first wireless device and a second wireless device, and where the second lobe is different from the first lobe and is used for communications between the first wireless device and a third wireless device. The operations of 1705 may be performed in accordance with examples as disclosed herein. In some examples, aspects of the operations of 1705 may be performed by a control component 1025 as described with reference to FIG. 10.

At 1710, the method may include determining an operating mode for communicating the message based on the control signaling indicating whether to simultaneously communicate the message. The operations of 1710 may be performed in accordance with examples as disclosed herein. In some examples, aspects of the operations of 1710 may be performed by a mode component 1040 as described with reference to FIG. 10.

At 1715, the method may include communicating the message according to the determined operating mode. The operations of 1715 may be performed in accordance with examples as disclosed herein. In some examples, aspects of the operations of 1715 may be performed by a communication component 1035 as described with reference to FIG. 10.

Figure 18:
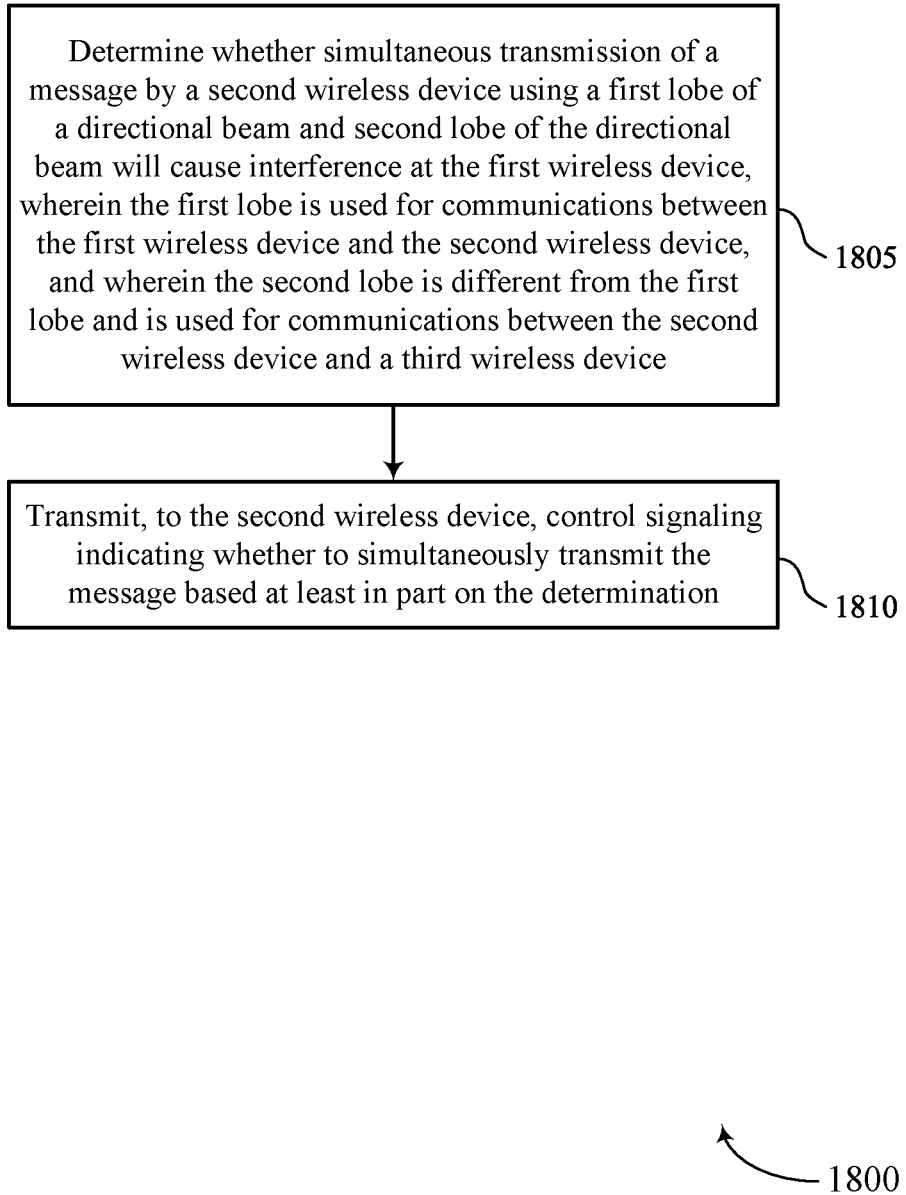

FIG. 18 shows a flowchart illustrating a method 1800 that supports techniques for communications on grating lobes in accordance with aspects of the present disclosure. The operations of the method 1800 may be implemented by a UE or a base station or its components as described herein. For example, the operations of the method 1800 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include determining whether simultaneous transmission of a message by a second wireless device using a first lobe of a directional beam and second lobe of the directional beam will cause interference at the first wireless device, where the first lobe is used for communications between the first wireless device and the second wireless device, and where the second lobe is different from the first lobe and is used for communications between the second wireless device and a third wireless device. The operations of 1805 may be performed in accordance with examples as disclosed herein. In some examples, aspects of the operations of 1805 may be performed by an interference component 1045 as described with reference to FIG. 10.

At 1810, the method may include transmitting, to the second wireless device, control signaling indicating whether to simultaneously transmit the message based on the determination. The operations of 1810 may be performed in accordance with examples as disclosed herein. In some examples, aspects of the operations of 1810 may be performed by a control component 1025 as described with reference to FIG. 10.

The following provides an overview of aspects of the present disclosure:

Aspect 1: A method for wireless communication at a first wireless device, comprising: receiving, from a second wireless device, control signaling indicating that a message is to be transmitted using a first lobe of a directional beam, the first lobe of the directional beam being different from a second lobe of the directional beam that is used to simultaneously transmit the message to a third wireless device; determining a set of beamforming parameters for receiving the message from the second wireless device based at least in part on the control signaling indicating that the message is to be transmitted using the first lobe of the directional beam; and receiving the message on the first lobe of the directional beam based at least in part on the set of beamforming parameters.

Aspect 2: The method of aspect 1, further comprising: receiving, from the second wireless device, a second message indicating a difference between a first gain associated with the first lobe of the directional beam and a second gain associated with the second lobe of the directional beam.

Aspect 3: The method of aspect 2, further comprising: decoding the message received on the first lobe of the directional beam based at least in part on the difference between the first gain and the second gain.

Aspect 4: The method of any of aspects 2 through 3, further comprising: transmitting, to the second wireless device, a third message indicating an MCS for transmitting the message based at least in part on the difference between the first gain and the second gain.

Aspect 5: The method of any of aspects 1 through 4, further comprising: transmitting, to the second wireless device, feedback associated with communicating with the second wireless device on a second directional beam different from the directional beam, wherein the control signaling indicating that the message is to be transmitted using the first lobe of the directional beam is based at least in part on the feedback.

Aspect 6: The method of aspect 5, wherein the feedback comprises a TCI state, one or more SSB indices, an indication of whether a signal strength associated with the second directional beam satisfies a signal strength threshold, or a combination thereof.

Aspect 7: The method of any of aspects 5 through 6, wherein transmitting the feedback to the second wireless device comprises: transmitting the feedback on the second directional beam.

Aspect 8: The method of any of aspects 1 through 7, wherein receiving the control signaling from the second wireless device comprises: receiving the control signaling on a second directional beam different from the directional beam.

Aspect 9: The method of any of aspects 1 through 8, wherein the control signaling further comprises a QCL indication associated with the directional beam, and determining the set of beamforming parameters is based at least in part on the QCL indication.

Aspect 10: The method of any of aspects 1 through 9, wherein the first lobe of the directional beam is a grating lobe from a set of lobes corresponding to the directional beam and the second lobe of the directional beam is a main lobe of the directional beam.

Aspect 11: The method of any of aspects 1 through 10, further comprising: transmitting, to the second wireless device, second control signaling indicating that a second message is to be transmitted using a first lobe of a second directional beam; determining a second set of beamforming parameters for simultaneously transmitting the second message to the second wireless device and a fourth wireless device based at least in part on indicating that the second message is to be transmitted using the first lobe of the second directional beam; and simultaneously transmitting the second message to the second wireless device and the fourth wireless device, wherein the second message is transmitted to the second wireless device using the first lobe of the second directional beam and transmitted to the fourth wireless device using a second lobe of the second directional beam different from the first lobe of the second directional beam.

Aspect 12: The method of aspect 11, further comprising: transmitting, to the second wireless device, or the fourth wireless device, or both, a third message indicating a difference between a first gain associated with the first lobe of the second directional beam and a second gain associated with the second lobe of the second directional beam.

Aspect 13: The method of aspect 12, further comprising: receiving, from the second wireless device, or the third wireless device, or both, a fourth message indicating an MCS for transmitting the second message based at least in part on the difference between the first gain and the second gain, wherein simultaneously transmitting the second message comprises simultaneously transmitting the second message according to the indicated MCS.

Aspect 14: The method of any of aspects 11 through 13, further comprising: determining a difference between a first gain associated with the first lobe of the second directional beam and a second gain associated with the second lobe of the second directional beam; and adjusting a transmit power associated with simultaneously transmitting the second message to compensate for the difference between the first gain and the second gain.

Aspect 15: The method of any of aspects 11 through 14, wherein the set of beamforming parameters comprises a set of beamforming weights used to generate the first lobe of the second directional beam and the second lobe of the second directional beam.

Aspect 16: The method of any of aspects 11 through 15, wherein the first lobe of the second directional beam is a grating lobe of the second directional beam and the second lobe of the second directional beam is a main lobe of the second directional beam.

Aspect 17: A method for wireless communication at a first wireless device in a wireless communication system, comprising: receiving, from a second wireless device, control signaling indicating that a message is to be simultaneously transmitted from the second wireless device and from a third wireless device to the first wireless device; determining a set of beamforming parameters for simultaneously receiving the message based at least in part on the control signaling indicating that the message is to be simultaneously transmitted; and simultaneously receiving the message from the second wireless device and the third wireless device based at least in part on determining the set of beamforming parameters, wherein the message is received from the second wireless device on a first lobe of a directional beam and from the third wireless device on a second lobe of the directional beam different from the first lobe.

Aspect 18: The method of aspect 17, further comprising: transmitting, to the second wireless device, or the third wireless device, or both, a second message indicating a difference between a first gain associated with the first lobe of the directional beam and a second gain associated with the second lobe of the directional beam, wherein simultaneously receiving the message is based at least in part on the difference between the first gain and the second gain.

Aspect 19: The method of any of aspects 17 through 18, wherein the set of beamforming parameters comprises a set of beamforming weights used to generate the first lobe of the directional beam and the second lobe of the directional beam.

Aspect 20: The method of any of aspects 17 through 19, wherein the wireless communication system comprises an SFN; and the second wireless device and the third wireless device each comprise a TRP in the SFN.

Aspect 21: A method for wireless communication at a first wireless device, comprising: receiving control signaling indicating whether to simultaneously communicate a message using a first lobe of a directional beam and a second lobe of the directional beam, wherein the first lobe is used for communications between the first wireless device and a second wireless device, and wherein the second lobe is different from the first lobe and is used for communications between the first wireless device and a third wireless device; determining an operating mode for communicating the message based at least in part on the control signaling indicating whether to simultaneously communicate the message; and communicating the message according to the determined operating mode.

Aspect 22: The method of aspect 21, further comprising: transmitting a second message indicating a first direction of the first lobe and a second direction of the second lobe, the second direction different from the first direction, wherein the control signaling indicating whether to simultaneously communicate the message is based at least in part on the first direction and the second direction.

Aspect 23: The method of any of aspects 21 through 22, wherein the control signaling indicating whether to simultaneously communicate the message is based at least in part on whether a first signal strength associated with communicating using the first lobe satisfies a first signal strength threshold and whether a second signal strength associated with communicating using the second lobe satisfies a second signal strength threshold.

Aspect 24: The method of any of aspects 21 through 23, wherein determining the operating mode comprises: selecting the operating mode to simultaneously communicate the message using the first lobe and the second lobe based at least in part on the control signaling indicating to simultaneously communicate the message.

Aspect 25: The method of any of aspects 21 through 23, wherein determining the operating mode comprises: selecting the operating mode to communicate the message to the second wireless device or the third wireless device using a first lobe of a second directional beam different from the directional beam based at least in part on the control signaling indicating not to simultaneously communicate the message.

Aspect 26: The method of any of aspects 21 through 25, wherein the control signaling indicating whether to simultaneously communicate the message is based at least in part on an operating frequency of the first wireless device, an inter-antenna element spacing of an antenna array of the first wireless device, a quantity of antenna elements of the antenna array, an elemental gain pattern of a representative antenna element of the antenna array, a peak elemental gain of the representative antenna element, a geometry of the antenna array, or a combination thereof.

Aspect 27: The method of any of aspects 21 through 26, wherein the control signaling comprises L1 signaling, L2 signaling, RRC signaling, or a combination thereof.

Aspect 28: A method for wireless communication at a first wireless device, comprising: determining whether simultaneous transmission of a message by a second wireless device using a first lobe of a directional beam and second lobe of the directional beam will cause interference at the first wireless device, wherein the first lobe is used for communications between the first wireless device and the second wireless device, and wherein the second lobe is different from the first lobe and is used for communications between the second wireless device and a third wireless device; and transmitting, to the second wireless device, control signaling indicating whether to simultaneously transmit the message based at least in part on the determination.

Aspect 29: The method of aspect 28, wherein the control signaling indicates the second wireless device is to switch operating frequencies based at least in part on determining that the simultaneous transmission of the message will cause interference at the first wireless device.

Aspect 30: The method of any of aspects 28 through 29, wherein determining whether the simultaneous transmission of the message will cause interference comprises: determining whether the simultaneous transmission of the message will cause interference based at least in part on a second indication of a first direction of the first lobe of the directional beam, a signal strength associated with the first lobe of the directional beam, an operating frequency of the second wireless device, an inter-antenna element spacing of an antenna array of the second wireless device, a quantity of antenna elements of the antenna array, an elemental gain pattern of a representative antenna element of the antenna array, a peak elemental gain of the representative antenna element, a geometry of the antenna array, or a combination thereof.

Aspect 31: An apparatus for wireless communication at a first wireless device, comprising a processor; memory coupled with the processor; and instructions stored in the memory and executable by the processor to cause the apparatus to perform a method of any of aspects 1 through 16.

Aspect 32: An apparatus for wireless communication at a first wireless device, comprising at least one means for performing a method of any of aspects 1 through 16.

Aspect 33: A non-transitory computer-readable medium storing code for wireless communication at a first wireless device, the code comprising instructions executable by a processor to perform a method of any of aspects 1 through 16.

Aspect 34: An apparatus for wireless communication at a first wireless device in a wireless communication system, comprising a processor; memory coupled with the processor; and instructions stored in the memory and executable by the processor to cause the apparatus to perform a method of any of aspects 17 through 20.

Aspect 35: An apparatus for wireless communication at a first wireless device in a wireless communication system, comprising at least one means for performing a method of any of aspects 17 through 20.

Aspect 36: A non-transitory computer-readable medium storing code for wireless communication at a first wireless device in a wireless communication system, the code comprising instructions executable by a processor to perform a method of any of aspects 17 through 20.

Aspect 37: An apparatus for wireless communication at a first wireless device, comprising a processor; memory coupled with the processor; and instructions stored in the memory and executable by the processor to cause the apparatus to perform a method of any of aspects 21 through 27.

Aspect 38: An apparatus for wireless communication at a first wireless device, comprising at least one means for performing a method of any of aspects 21 through 27.

Aspect 39: A non-transitory computer-readable medium storing code for wireless communication at a first wireless device, the code comprising instructions executable by a processor to perform a method of any of aspects 21 through 27.

Aspect 40: An apparatus for wireless communication at a first wireless device, comprising a processor; memory coupled with the processor; and instructions stored in the memory and executable by the processor to cause the apparatus to perform a method of any of aspects 28 through 30.

Aspect 41: An apparatus for wireless communication at a first wireless device, comprising at least one means for performing a method of any of aspects 28 through 30.

Aspect 42: A non-transitory computer-readable medium storing code for wireless communication at a first wireless device, the code comprising instructions executable by a processor to perform a method of any of aspects 28 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
receiving, from a second wireless device, control signaling indicating that a message is to be transmitted using a first lobe of a directional beam, the first lobe of the directional beam being different from a second lobe of the directional beam that is used to simultaneously transmit the message to a third wireless device;
determining a set of beamforming parameters for receiving the message from the second wireless device based at least in part on the control signaling indicating that the message is to be transmitted using the first lobe of the directional beam; and
receiving the message on the first lobe of the directional beam based at least in part on the set of beamforming parameters.

2. The method of claim 1, further comprising:
receiving, from the second wireless device, a second message indicating a difference between a first gain associated with the first lobe of the directional beam and a second gain associated with the second lobe of the directional beam.

3. The method of claim 2, further comprising:
decoding the message received on the first lobe of the directional beam based at least in part on the difference between the first gain and the second gain.

4. The method of claim 2, further comprising:
transmitting, to the second wireless device, a third message indicating a modulation and coding scheme for transmitting the message based at least in part on the difference between the first gain and the second gain.

5. The method of claim 1, further comprising:
transmitting, to the second wireless device, feedback associated with communicating with the second wireless device on a second directional beam different from the directional beam, wherein the control signaling indicating that the message is to be transmitted using the first lobe of the directional beam is based at least in part on the feedback.

6. The method of claim 5, wherein the feedback comprises a transmission configuration indication state, one or more synchronization signal block indices, an indication of whether a signal strength associated with the second directional beam satisfies a signal strength threshold, or a combination thereof.

7. The method of claim 5, wherein transmitting the feedback to the second wireless device comprises:
transmitting the feedback on the second directional beam.

8. The method of claim 1, wherein receiving the control signaling from the second wireless device comprises:
receiving the control signaling on a second directional beam different from the directional beam.

9. The method of claim 1, wherein the control signaling further comprises a quasi-colocation indication associated with the directional beam, and wherein determining the set of beamforming parameters is based at least in part on the quasi-colocation indication.

10. The method of claim 1, wherein the first lobe of the directional beam is a grating lobe from a set of lobes corresponding to the directional beam and the second lobe of the directional beam is a main lobe of the directional beam.

11. The method of claim 1, further comprising:
transmitting, to the second wireless device, second control signaling indicating that a second message is to be transmitted using a first lobe of a second directional beam;
determining a second set of beamforming parameters for simultaneously transmitting the second message to the second wireless device and a fourth wireless device based at least in part on indicating that the second message is to be transmitted using the first lobe of the second directional beam; and
simultaneously transmitting the second message to the second wireless device and the fourth wireless device, wherein the second message is transmitted to the second wireless device using the first lobe of the second directional beam and transmitted to the fourth wireless device using a second lobe of the second directional beam different from the first lobe of the second directional beam.

12. The method of claim 11, further comprising:
transmitting, to the second wireless device, or the fourth wireless device, or both, a third message indicating a difference between a first gain associated with the first lobe of the second directional beam and a second gain associated with the second lobe of the second directional beam.

13. The method of claim 12, further comprising:
receiving, from the second wireless device, or the third wireless device, or both, a fourth message indicating a modulation and coding scheme for transmitting the second message based at least in part on the difference between the first gain and the second gain, wherein simultaneously transmitting the second message comprises simultaneously transmitting the second message according to the indicated modulation and coding scheme.

14. The method of claim 11, further comprising:
determining a difference between a first gain associated with the first lobe of the second directional beam and a second gain associated with the second lobe of the second directional beam; and
adjusting a transmit power associated with simultaneously transmitting the second message to compensate for the difference between the first gain and the second gain.

15. The method of claim 11, wherein the set of beamforming parameters comprises a set of beamforming weights used to generate the first lobe of the second directional beam and the second lobe of the second directional beam.

16. The method of claim 11, wherein the first lobe of the second directional beam is a grating lobe of the second directional beam and the second lobe of the second directional beam is a main lobe of the second directional beam.

17. An apparatus for wireless communication at a first wireless device, comprising:
a processor;
memory coupled with the processor; and
instructions stored in the memory and executable by the processor to cause the apparatus to:
receive, from a second wireless device, control signaling indicating that a message is to be transmitted using a first lobe of a directional beam, the first lobe of the directional beam being different from a second lobe of the directional beam that is used to simultaneously transmit the message to a third wireless device;
determine a set of beamforming parameters for receiving the message from the second wireless device based at least in part on the control signaling indicating that the message is to be transmitted using the first lobe of the directional beam; and receive the message on the first lobe of the directional beam based at least in part on the set of beamforming parameters.

18. The apparatus of claim 17, wherein the instructions are further executable by the processor to cause the apparatus to:
receive, from the second wireless device, a second message indicating a difference between a first gain associated with the first lobe of the directional beam and a second gain associated with the second lobe of the directional beam.

19. The apparatus of claim 18, wherein the instructions are further executable by the processor to cause the apparatus to:
decode the message received on the first lobe of the directional beam based at least in part on the difference between the first gain and the second gain.

20. The apparatus of claim 18, wherein the instructions are further executable by the processor to cause the apparatus to:
transmit, to the second wireless device, a third message indicating an MCS for transmitting the message based at least in part on the difference between the first gain and the second gain.

21. The apparatus of claim 17, wherein the instructions are further executable by the processor to cause the apparatus to:
transmit, to the second wireless device, feedback associated with communicating with the second wireless device on a second directional beam different from the directional beam, wherein the control signaling indicating that the message is to be transmitted using the first lobe of the directional beam is based at least in part on the feedback.

22. The apparatus of claim 21, wherein the feedback comprises a TCI state, one or more SSB indices, an indication of whether a signal strength associated with the second directional beam satisfies a signal strength threshold, or a combination thereof.

23. The apparatus of claim 21, wherein the instructions to transmit the feedback to the second wireless device are executable by the processor to cause the apparatus to:
transmit the feedback on the second directional beam.

24. The apparatus of claim 17, wherein the instructions to receive the control signaling from the second wireless device are executable by the processor to cause the apparatus to:
receive the control signaling on a second directional beam different from the directional beam.

25. The apparatus of claim 17, wherein the control signaling further comprises a quasi-colocation indication associated with the directional beam, and wherein determining the set of beamforming parameters is based at least in part on the quasi-colocation indication.

26. The apparatus of claim 17, wherein the first lobe of the directional beam is a grating lobe of the directional beam and the second lobe of the directional beam is a main lobe of the directional beam.

27. The apparatus of claim 17, wherein the instructions are further executable by the processor to cause the apparatus to:
transmit, to the second wireless device, second control signaling indicating that a second message is to be transmitted using a first lobe of a second directional beam;
determine a second set of beamforming parameters for simultaneously transmitting the second message to the second wireless device and a fourth wireless device based at least in part on indicating that the second message is to be transmitted using the first lobe of the second directional beam; and
simultaneously transmit the second message to the second wireless device and the fourth wireless device, wherein the second message is transmitted to the second wireless device using the first lobe of the second directional beam and transmitted to the fourth wireless device using a second lobe of the second directional beam different from the first lobe of the second directional beam.

28. The apparatus of claim 27, wherein the instructions are further executable by the processor to cause the apparatus to:
transmit, to the second wireless device, or the fourth wireless device, or both, a third message indicating a difference between a first gain associated with the first lobe of the second directional beam and a second gain associated with the second lobe of the second directional beam.

29. An apparatus for wireless communication at a first wireless device, comprising:
means for receiving, from a second wireless device, control signaling indicating that a message is to be transmitted using a first lobe of a directional beam, the first lobe of the directional beam being different from a second lobe of the directional beam that is used to simultaneously transmit the message to a third wireless device;
means for determining a set of beamforming parameters for receiving the message from the second wireless device based at least in part on the control signaling indicating that the message is to be transmitted using the first lobe of the directional beam; and
means for receiving the message on the first lobe of the directional beam based at least in part on the set of beamforming parameters.

30. A non-transitory computer-readable medium storing code for wireless communication at a first wireless device, the code comprising instructions executable by a processor to:
receive, from a second wireless device, control signaling indicating that a message is to be transmitted using a first lobe of a directional beam, the first lobe of the directional beam being different from a second lobe of the directional beam that is used to simultaneously transmit the message to a third wireless device;
determine a set of beamforming parameters for receiving the message from the second wireless device based at least in part on the control signaling indicating that the message is to be transmitted using the first lobe of the directional beam; and
receive the message on the first lobe of the directional beam based at least in part on the set of beamforming parameters.

* * * * *